US012431080B2

(12) United States Patent
Kim

(10) Patent No.: US 12,431,080 B2
(45) Date of Patent: Sep. 30, 2025

(54) DISPLAY DEVICE

(71) Applicant: Samsung Display Co., LTD., Yongin-si (KR)

(72) Inventor: Keun Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/152,719

(22) Filed: Jan. 10, 2023

(65) Prior Publication Data

US 2023/0317008 A1 Oct. 5, 2023

(30) Foreign Application Priority Data

Apr. 5, 2022 (KR) ........................ 10-2022-0042090

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01); *G09G 2320/0233* (2013.01); *G09G 2320/0247* (2013.01); *G09G 2330/021* (2013.01)

(58) Field of Classification Search
CPC .. G09G 3/3233; G09G 3/3208; G09G 3/3258; G09G 2320/043; G09G 2320/045; H10K 59/12; H01L 29/78648
See application file for complete search history.

(56) References Cited

U.S. PATENT DOCUMENTS

| | | | | |
|---|---|---|---|---|
| 2006/0061526 A1* | 3/2006 | Shirasaki | G09G 3/3233 | 345/77 |
| 2006/0097628 A1* | 5/2006 | Suh | H10K 59/131 | 313/504 |
| 2010/0053041 A1* | 3/2010 | Abe | G09G 3/325 | 348/333.01 |
| 2018/0069069 A1* | 3/2018 | Ebisuno | H10K 59/352 | |
| 2019/0057648 A1* | 2/2019 | Xu | G09G 3/3275 | |
| 2020/0005708 A1* | 1/2020 | Hwang | G09G 3/3258 | |
| 2021/0043139 A1* | 2/2021 | Cha | G09G 3/3233 | |
| 2021/0090494 A1* | 3/2021 | Hwang | G09G 3/3233 | |
| 2021/0125556 A1* | 4/2021 | Yamamoto | G09G 3/3233 | |
| 2021/0280652 A1 | 9/2021 | Kim et al. | | |

FOREIGN PATENT DOCUMENTS

| | | |
|---|---|---|
| CN | 113363290 A | 9/2021 |
| KR | 2021-0113513 A | 9/2021 |

* cited by examiner

*Primary Examiner* — Yuzhen Shen
(74) *Attorney, Agent, or Firm* — Womble Bond Dickinson (US) LLP

(57) ABSTRACT

A display device includes: a sub-pixel connected to a k-th scan line and a j-th data line crossing the k-th scan line, wherein the sub-pixel includes: a light emitting element; a driving transistor configured to provide a driving current to the light emitting element according to a data voltage applied to a gate electrode thereof and including a first lower line; a first sub-transistor and a second sub-transistor connected to the gate electrode of the driving transistor and connected to each other in series; and a first node connecting the first sub-transistor and the second sub-transistor to each other, and the first node is connected to the first lower line.

20 Claims, 20 Drawing Sheets

DT: DTG, 110

DT: DTG, 110

DT: DTG, 110

GTL1: C1, G1, G6, DTG
CTL2: C2
DTL: DLj, VDDL2, BE1, ANDE

GTL1: G2-1, G2-2, DTG, C1
GTL2: C2
DTL: BE1, CE1
ST2: ST2-1, ST2-2

ST2-2: G2-2, 120

GTL1: G2-1, G2-2, DTG, C1
GTL2: C2
DTL: CE2
ST3: ST3-1, ST3-2

DISPLAY DEVICE

CROSS-REFERENCE TO RELATED APPLICATION

The present application claims priority to and the benefit of Korean Patent Application No. 10-2022-0042090 filed on Apr. 5, 2022 in the Korean Intellectual Property Office, the contents of which in its entirety are herein incorporated by reference.

BACKGROUND

1. Field

The present disclosure relates to a display device.

2. Description of the Related Art

As the information society develops, the demand for display devices for displaying images has increased and become more diversified. For example, display devices have been applied to various electronic devices such as smartphones, digital cameras, laptop computers, navigation devices, smart watches, and smart televisions. The display devices may be flat panel display devices such as liquid crystal display devices, field emission display devices, or organic light emitting display devices.

An organic light emitting display device may generally include a plurality of pixels, each of which includes a light emitting element, a driving transistor adjusting an amount of a driving current supplied from a power source to the light emitting element according to a voltage of a gate electrode thereof, and a plurality of switching transistors switched according to scan signals of scan lines. Some of the plurality of switching transistors may be formed as dual transistors connected to each other in series in order to prevent a leakage current.

Meanwhile, in order to decrease power consumption in the display device, a variable refresh rate (VRR) driving method of driving an image having a great change in gradation between frames at a high frequency and driving a still image having a small change in gradation between frames at a low frequency may be utilized. In a case of a low frequency driving method or the VRR driving method, when leakage current characteristics are excellent, a decrease in power consumption may be more effectively applied.

The above information disclosed in this Background section is only for enhancement of understanding of the background and therefore the information discussed in this Background section does not necessarily constitute prior art.

SUMMARY

Aspects of the present disclosure include a display device having relatively improved luminance and relatively improved power consumption by improving leakage current characteristics.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a display device comprising: a sub-pixel connected to a k-th scan line and a j-th data line crossing the k-th scan line, wherein the sub-pixel includes: a light emitting element; a driving transistor providing a driving current to the light emitting element according to a data voltage applied to a gate electrode thereof and including a first lower line; a first sub-transistor and a second sub-transistor connected to the gate electrode of the driving transistor and connected to each other in series; and a first node connecting the first sub-transistor and the second sub-transistor to each other, and the first node is connected to the first lower line.

The first lower line may overlap the gate electrode of the driving transistor.

The gate electrode of the driving transistor may be a top gate electrode of the driving transistor, and the first lower line may be a bottom gate electrode of the driving transistor.

Each of the first sub-transistor and the second sub-transistor may include a gate electrode connected to the k-th scan line.

A voltage of the first node may be constant at a rise time of a k-th scan signal of the k-th scan line.

The sub-pixel may further include a first transistor connected between one electrode of the driving transistor and the j-th data line, and the k-th scan line may be a k-th scan write line, and may be connected to a gate electrode of the first transistor.

The first sub-transistor may include a first electrode connected to one electrode of the driving transistor and a second electrode connected to a first electrode of the second sub-transistor and the first node, and the second sub-transistor may be include the first electrode connected to the first node and the second electrode of the first sub-transistor and a second electrode connected to the gate electrode of the driving transistor.

The sub-pixel may further include a first connection electrode connecting the first lower line and the first node to each other, and the first connection electrode may be connected to the first lower line through a first bridge contact hole, and may be connected to one electrode of the first sub-transistor and one electrode of the second sub-transistor through a second bridge contact hole.

The first connection electrode may cross the k-th scan line.

The k-th scan line may include a k-th scan write line and a k-th scan control line spaced apart from each other, the sub-pixel may further include a first transistor connected between one electrode of the driving transistor and the j-th data line, a gate electrode of the first sub-transistor and a gate electrode of the second sub-transistor may be connected to the k-th scan control line, and a gate electrode of the first transistor may be connected to the k-th scan write line.

The sub-pixel may further include: a second lower line overlapping a gate electrode of the second sub-transistor; a third sub-transistor and a fourth sub-transistor connected to the gate electrode of the driving transistor and connected to each other in series; and a second node connecting the third sub-transistor and the fourth sub-transistor to each other, and wherein the second node may be connected to the second lower line.

The third sub-transistor may include a first electrode connected to the gate electrode of the driving transistor and a second electrode connected to a first electrode of the fourth sub-transistor and the second node, and the fourth sub-transistor may include the first electrode connected to the second node and the second electrode of the third sub-transistor and a second electrode connected to an initialization voltage line.

The k-th scan line may include a k-th scan initialization line, each of the third sub-transistor and the fourth sub-transistor may be connected to the k-th scan initialization line, and the gate electrode of the driving transistor may be initialized according to a k-th scan initialization signal of the k-th scan initialization line.

A voltage of the second node may be constant at a rise time of the k-th scan initialization signal of the k-th scan initialization line.

The sub-pixel may further include a second connection electrode connecting the second lower line and the second node to each other, and the second connection electrode may be connected to the second lower line through a third bridge contact hole, and may be connected to one electrode of the third sub-transistor and one electrode of the fourth sub-transistor through a fourth bridge contact hole.

According to another aspect of the present disclosure, there is provided a display device comprising: a substrate; a first lower line on the substrate; a buffer film on the first lower line; an active layer on the buffer film, the active layer including a first channel overlapping the first lower line and a first sub-channel and a second sub-channel connected to each other through a first node area; a gate insulating film on the active layer; a first gate conductive layer on the gate insulating film, the first gate conductive layer including a gate electrode overlapping the first channel and the first lower line, and a k-th scan line overlapping both the first sub-channel and the second sub-channel; a first interlayer insulating film on the first gate conductive layer; a second gate conductive layer on the first interlayer insulating film; a second interlayer insulating film on the second gate conductive layer; and a first connection electrode on the second interlayer insulating film, wherein the first connection electrode may be connected to the first lower line through a first bridge contact hole, and may be connected to the first node area between the first sub-channel and the second sub-channel through a second bridge contact hole.

The first bridge contact hole may penetrate through the buffer film, the gate insulating film, the first interlayer insulating film, and the second interlayer insulating film to expose the first lower line, and the second bridge contact hole may penetrate through the gate insulating film, the first interlayer insulating film, and the second interlayer insulating film to expose the first node area.

The k-th scan line may extend in one direction to overlap the second sub-channel, and may at least partially protrude in the other direction crossing the one direction to overlap the first sub-channel, and the first connection electrode may extend in the other direction to overlap the k-th scan line.

The display device may further comprise: a second lower line on the substrate, the second lower line being covered by the buffer film; a third sub-channel and a fourth sub-channel on the buffer film, the third sub-channel and the fourth sub-channel being covered by the gate insulating film, and connected to each other through a second node area; a sub-gate electrode on the gate insulating film, the sub-gate electrode overlapping the second sub-channel and the second lower line; a k-th scan initialization line on the gate insulating film, the k-th scan initialization line overlapping the third sub-channel at least twice; and a second connection electrode on the second interlayer insulating film, wherein the second connection electrode may be connected to the second lower line through a third bridge contact hole, and may be connected to the second node area between the third sub-channel and the fourth sub-channel through a fourth bridge contact hole.

Third bridge contact hole may penetrate through the buffer film, the gate insulating film, the first interlayer insulating film, and the second interlayer insulating film to expose the second lower line, and the fourth bridge contact hole may penetrate through the gate insulating film, the first interlayer insulating film, and the second interlayer insulating film to expose the second node area.

With a display device according to some embodiments, by connecting a line to a connection node between dual transistors, it may be possible to prevent or reduce changes to a voltage of a connection node between the dual transistors as a voltage of gate electrodes of the dual transistors changes. Accordingly, leakage current characteristics of the display device may be improved.

With the display device according to some embodiments, luminance and power consumption may be improved in a low frequency driving method or a variable refresh rate (VRR) driving method.

The effects of the present disclosure are not limited to the aforementioned effects, and various other effects are included in the present specification.

BRIEF DESCRIPTION OF THE DRAWINGS

The above and other aspects and features of the present disclosure will become more apparent by describing in more detail aspects of some embodiments thereof with reference to the attached drawings, in which.

DETAILED DESCRIPTION

Figure 1:
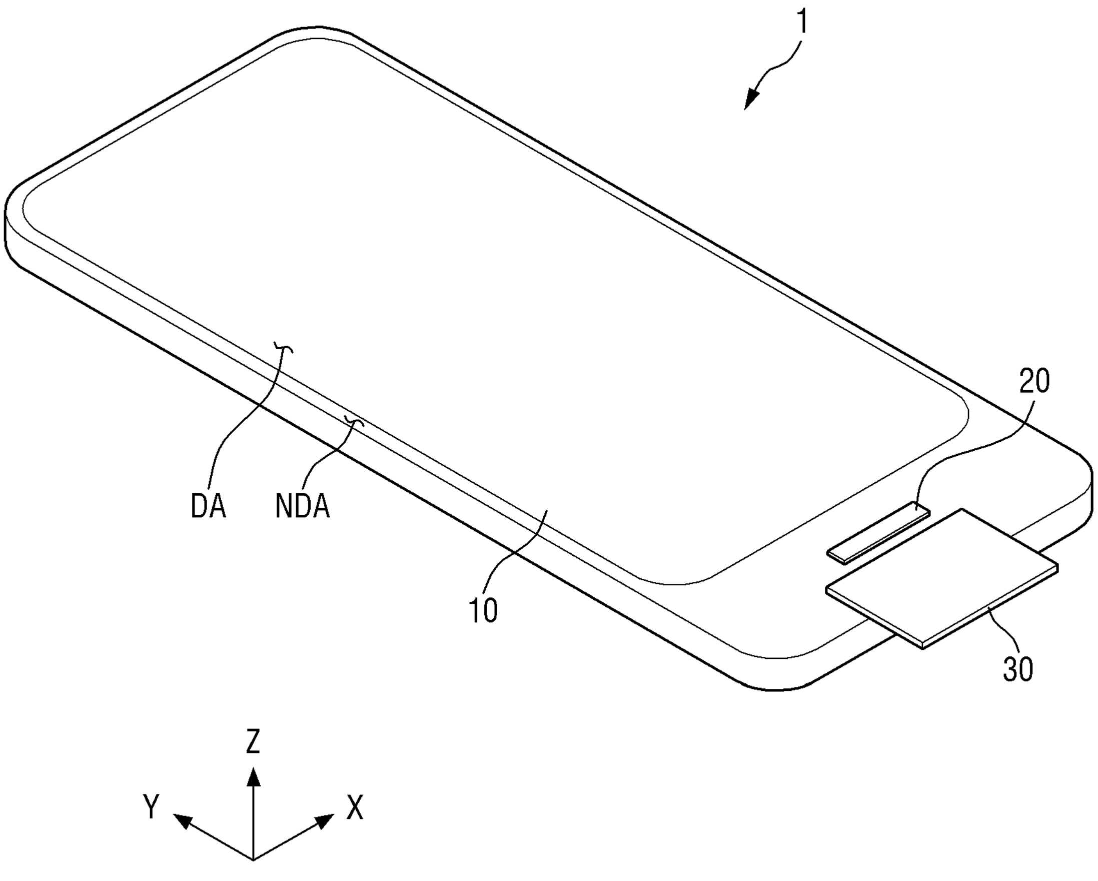
FIG. 1 is a perspective view illustrating a display device according to some embodiments.

Aspects of some embodiments of the invention will now be described more fully hereinafter with reference to the accompanying drawings, in which some embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached drawing figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. A region illustrated or described as flat may, typically, have rough and/or nonlinear features, for example. Moreover, sharp angles that are illustrated may be rounded. Thus, the regions illustrated in the drawing figures are schematic in nature and their shapes are not intended to illustrate the precise shape of a region and are not intended to limit the scope of the claims.

Hereinafter, aspects of some embodiments will be described in more detail with reference to the accompanying drawings.

Figure 2:
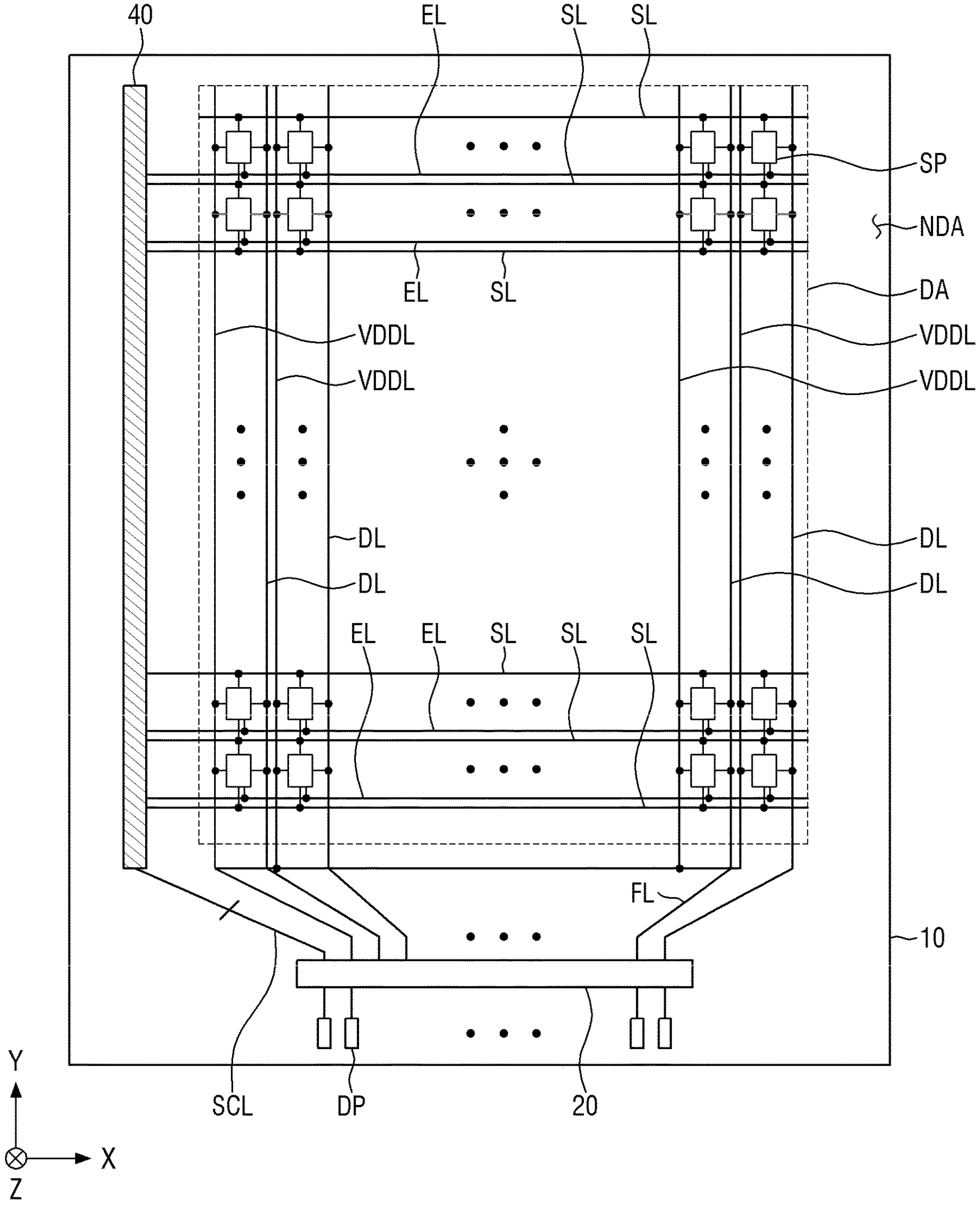
FIG. 2 is a plan view illustrating the display device according to some embodiments.

FIG. 1 is a perspective view illustrating a display device according to some embodiments. FIG. 2 is a plan view illustrating the display device according to some embodiments.

The terms "above", "top", and "upper surface" as used herein refer to an upward direction (i.e., a Z-axis direction) with respect to a display panel 10. The terms "below", "bottom", and "lower surface" as used herein refer to a downward direction (i.e., a direction opposite to the Z-axis direction) with respect to the display panel 10.

In addition, "left", "right", "upper", and "lower" refer to directions when the display panel is viewed in plan view. For example, "left" refers to a direction opposite to an X-axis direction, "right" refers to the X-axis direction, "upper" refers to a Y-axis direction, and "lower" refers to a direction opposite to the Y-axis direction.

Referring to FIGS. 1 and 2, a display device 1 is a device that displays a moving (e.g., video) image or a still (e.g., static) image, and may be used as a display screen of various products such as televisions, laptop computers, monitors, billboards, and the Internet of Things (IOT) as well as portable electronic devices such as mobile phones, smartphones, tablet personal computers (PCs), smart watches, watch phones, mobile communication terminals, electronic notebooks, electronic books, portable multimedia players (PMPs), navigation devices, and ultra mobile PCs (UMPCs).

The display device 1 may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro light emitting diode (micro LED). Hereinafter, it will be mainly described that the display device 1 is the organic light emitting display device, but embodiments according to the present disclosure are not limited thereto.

The display device 1 includes a display panel 10, a display driving circuit 20, and a circuit board 30.

The display panel 10 may have a rectangular shape, in a plan view, having short sides in a first direction X and long sides in a second direction Y crossing the first direction X. A corner where the short side in the first direction X and the long side in the second direction Y meet may be rounded with a curvature (e.g., a set or predetermined curvature) or may be right-angled. The shape of the display panel 10 in plan view is not limited to the rectangular shape, and may be other polygonal shapes, a circular shape, or an elliptical shape. For example, the display panel 10 may be formed to be flat, but embodiments according to the present disclosure are not limited thereto, and according to some embodiments the display panel 10 may include curved surface parts formed at left and right ends and having a constant curvature or a varying curvature. In addition, the display panel 10 may be flexibly formed to be bent, folded, or rolled.

The display panel 10 may include a display area DA in which sub-pixels SP are formed to display an image and a non-display area NDA, which is a peripheral area of the display area DA. In the display area DA, not only the sub-pixels SP, but also scan lines SL, emission lines EL, data lines DL, and first driving voltage lines VDDL connected to the sub-pixels SP may be arranged. The scan lines SL and the emission lines EL may be formed in parallel with each other in the first direction X, and the data lines DL may be formed in parallel with each other in the second direction Y crossing the first direction X. The first driving voltage lines VDDL may be formed in parallel with each other in the second direction Y in the display area DA. The first driving voltage lines VDDL formed in parallel with each other in the second direction Y in the display area DA may be connected to each other in the non-display area NDA.

Each of the sub-pixels SP may be connected to at least one of the scan lines SL, any one of the data lines DL, at least one of the emission lines EL, and the first driving voltage line VDDL. It has been illustrated in FIG. 2 that each of the sub-pixels SP is connected to two scan lines SL, one data line DL, one emission line EL, and the first driving voltage line VDDL, but embodiments according to the present disclosure are not limited thereto. For example, each of the sub-pixels SP may also be connected to fourth scan lines SL rather than the two scan lines SL.

Each of the sub-pixels SP may include a driving transistor, at least one transistor, a light emitting element, and a capacitor. The transistor may be turned on when a scan signal is applied from the scan line SL thereto, and thus, a data voltage of the data line DL may be applied to a gate electrode of the driving transistor. The driving transistor may allow the light emitting element to emit light by supplying a driving current to the light emitting element according to the data voltage applied to the gate electrode thereof. The driving transistor and at least one transistor may be thin film transistors. The light emitting element may emit light according to the driving current of the driving transistor. The light emitting element may be an organic light emitting diode including an anode electrode, an organic light emitting layer, and a cathode electrode. The capacitor may serve to keep the data voltage applied to the gate electrode of the driving transistor constant.

The non-display area NDA may be defined as an area from the outside of the display area DA to an edge of the display panel 10. In the non-display area NDA, a scan driving circuit 40 for applying scan signals to the scan lines SL, fan-out lines FL between the data lines DL and the display driving circuit 20, and pads DP connected to the display driving circuit 20 may be arranged. The display driving circuit 20 and the pads DP may be located at one edge of the display panel 10. The pads DP may be arranged more adjacent to one edge of the display panel 10 than the display driving circuit 20 is.

The scan driving circuit 40 may be connected to the display driving circuit 20 through a plurality of scan control lines SCL. The scan driving circuit 40 may receive a scan control signal SCS and an emission control signal ECS from the display driving circuit 20 through the plurality of scan control lines SCL. The scan driving circuit 40 may include a scan driver and an emission control driver. The scan lines SL may include a k-th scan initialization line GILk, a k-th scan write line GWLk, and a k+1-th scan write line GWLk+1, as illustrated in FIG. 3.

The display driving circuit 20 may be formed as an integrated circuit (IC) and be attached onto the display panel 10 in a chip on glass (COG) manner, a chip on plastic (COP) manner, or an ultrasonic bonding manner, but embodiments according to the present disclosure are not limited thereto. For example, the display driving circuit may be attached on the circuit board 30.

The circuit board 30 may be attached on the pads DP using an anisotropic conductive film. Accordingly, lead lines of the circuit board 30 may be electrically connected to the pads DP. The circuit board 30 may be a flexible printed circuit board, a printed circuit board, or a flexible film such as a chip on film.

Figure 3:
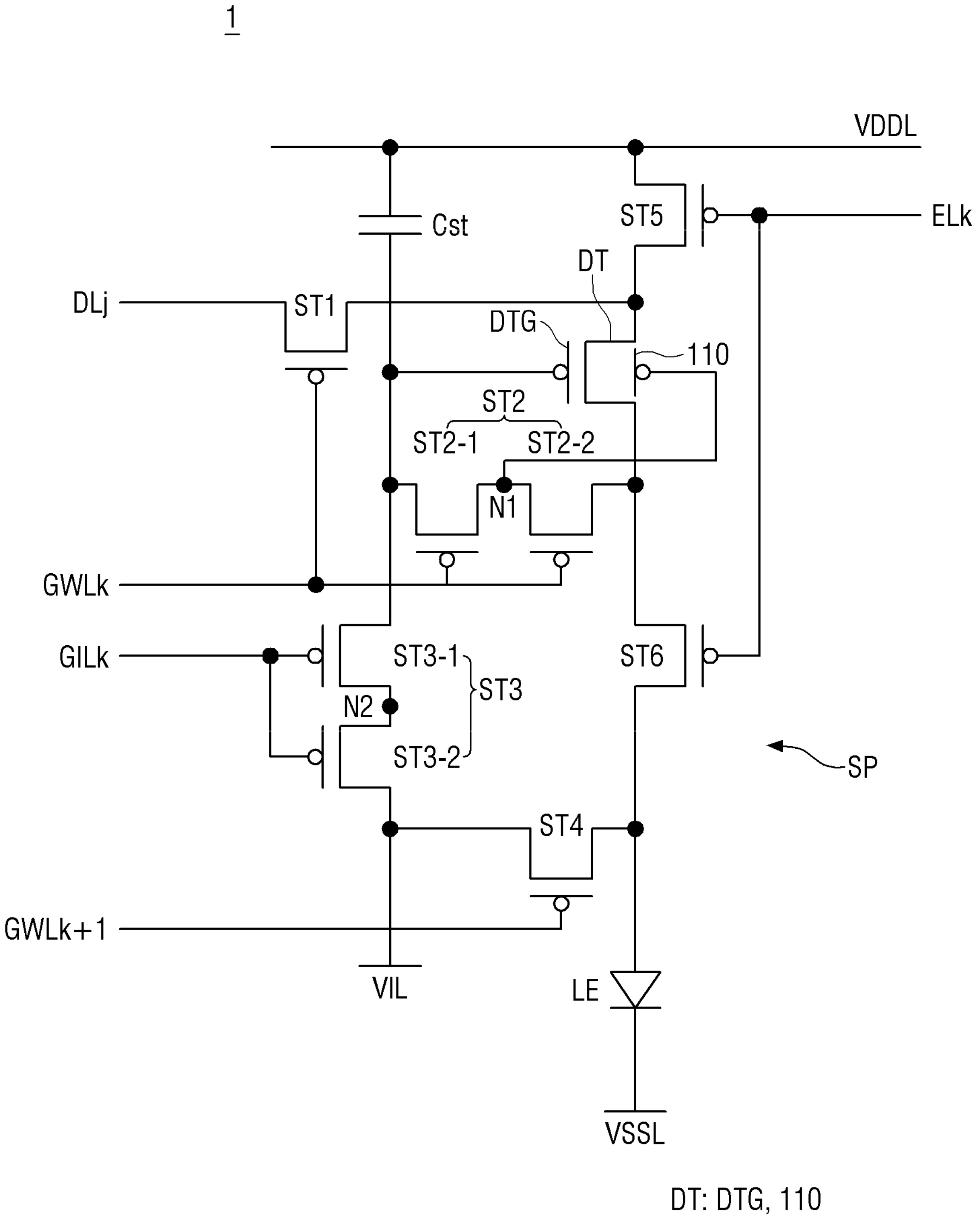
FIG. 3 is a circuit diagram illustrating a sub-pixel according to some embodiments.

FIG. 3 is a circuit diagram illustrating a sub-pixel according to some embodiments.

Referring to FIG. 3, the sub-pixel SP may be connected to a k-th (k is a positive integer) scan initialization line GILk, a k-th scan write line GWLk, a k+1-th scan write line GWLk+1, a k-th emission line ELk, and a j-th (j is a positive integer) data line DLj. In addition, the sub-pixel SP may be connected to a first driving voltage line VDDL to which a first driving voltage is supplied, an initialization voltage line VIL to which an initialization voltage Vini is supplied, and a second driving voltage line VSSL to which a second driving voltage is supplied.

The sub-pixel SP includes a driving transistor DT, a light emitting element LE, switch elements, a capacitor Cst, and the like. The switch elements include first to sixth transistors ST1, ST2, ST3, ST4, ST5, and ST6.

The driving transistor DT may include a gate electrode DTG, a first electrode, a second electrode, and a first lower line 110. The gate electrode DTG may be a top gate electrode located above an active layer of the driving transistor DT, and the first lower line 110 may be a bottom gate electrode located below the active layer of the driving transistor DT. The gate electrode DTG may be a main gate electrode of the driving transistor DT, and the first lower line 110 may be an auxiliary gate electrode of the driving transistor DT.

The driving transistor DT controls a drain-source current Ids (hereinafter, referred to as a "driving current") according to a data voltage applied to the gate electrode DTG. The driving current Ids flowing through a channel of the driving transistor DT is proportional to the square of a difference between a gate-source voltage Vsg and a threshold voltage of the driving transistor DT as represented in Equation 1.

$$Ids=k'\times(Vsg-Vth)^2 \quad \text{Equation 1}$$

Here, k' refers to a proportional coefficient determined by a structure and physical characteristics of the driving transistor, Vsg refers to the gate-source voltage of the driving transistor, and Vth refers to the threshold voltage of the driving transistor.

The first lower line 110 of the driving transistor DT may be connected to a first node N1, which is a connection node between two sub-transistors of the second transistor ST2, which is a dual transistor. That is, the first lower line 110 may be connected to the first node N1 corresponding to a first electrode of a first sub-transistor ST2-1 and a second electrode of a second sub-transistor ST2-2.

The light emitting element LE emits light according to the driving current Ids. An amount of light emitted from the light emitting element LE may be proportional to the driving current Ids.

Figure 13:
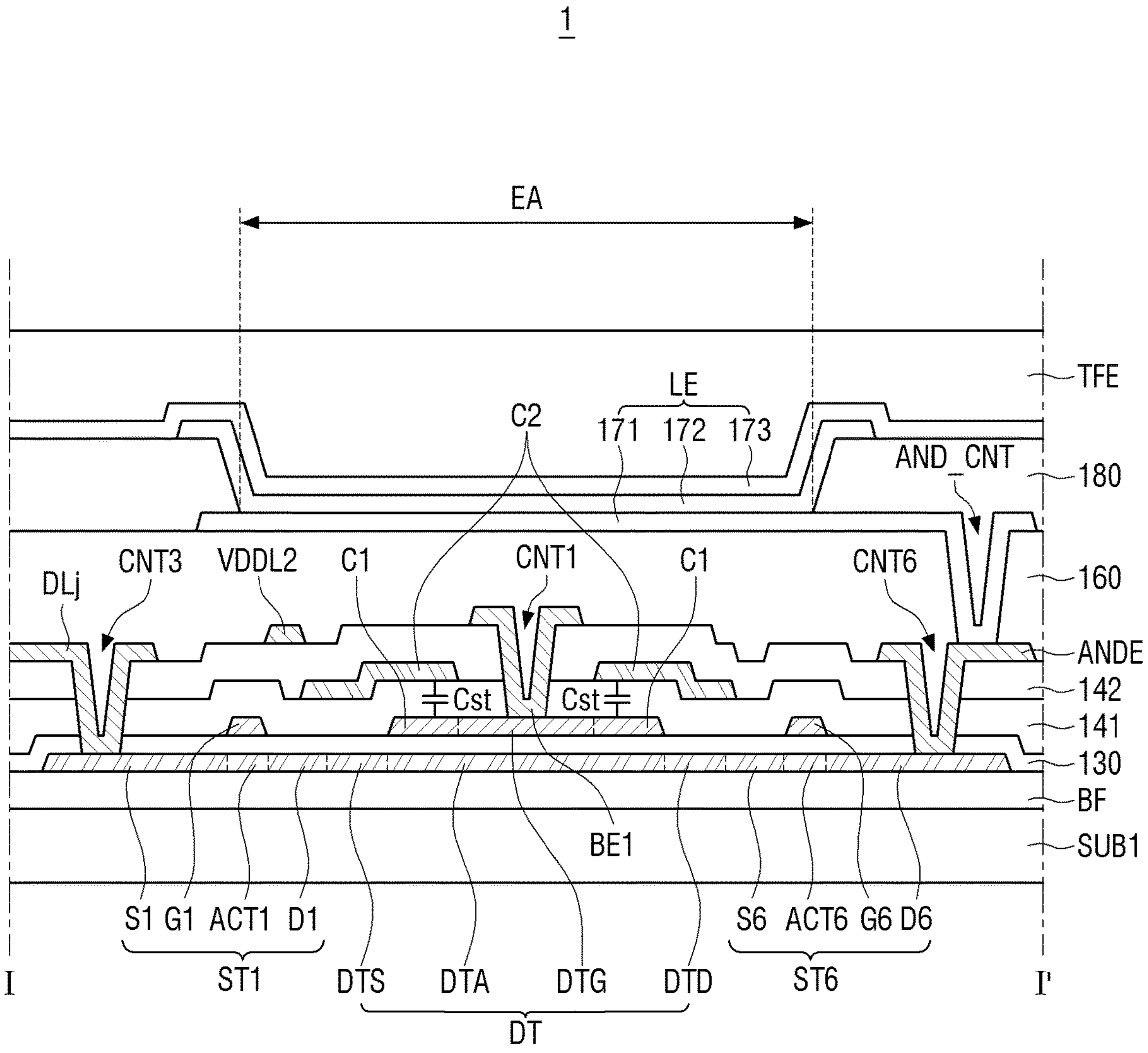
FIG. 13 is a cross-sectional view taken along the line I-I' of FIG. 12.

The light emitting element LE may be an organic light emitting diode including an anode electrode, a cathode electrode, and an organic light emitting layer located between the anode electrode and the cathode electrode. Alternatively, the light emitting element LE may be an inorganic light emitting element including an anode electrode, a cathode electrode, and an inorganic semiconductor located between the anode electrode and the cathode electrode. Alternatively, the light emitting element LE may be a quantum dot light emitting element including an anode electrode, a cathode electrode, and a quantum dot light emitting layer located between the anode electrode and the cathode electrode. Alternatively, the light emitting element LE may be a micro light emitting diode. In FIG. 13, the anode electrode of the light emitting element LE corresponds to a first electrode 171, and the cathode electrode of the light emitting element LE corresponds to a second electrode 173.

The anode electrode of the light emitting element ED may be connected to a first electrode of the fourth transistor ST4 and a second electrode of the sixth transistor ST6, and the cathode electrode of the light emitting element ED may be connected to the second driving voltage line VSSL.

The first transistor ST1 is turned on by a k-th scan write signal of the k-th scan write line GWLk to connect the first electrode of the driving transistor DT and the j-th data line DLj to each other. A gate electrode of the first transistor ST1 may be connected to the k-th scan write line GWLk, a first electrode of the first transistor ST1 may be connected to the first electrode of the driving transistor DT, and a second electrode of the first transistor ST1 may be connected to the j-th data line DLj.

The second transistor ST2 may be formed as a dual transistor in which the first sub-transistor ST2-1 and the second sub-transistor ST2-2 are connected to each other in series. The first sub-transistor ST2-1 and the second sub-transistor ST2-2 are turned on by the k-th scan write signal of the k-th scan write line GWLk to connect the gate electrode DTG and the second electrode of the driving transistor DT to each other. That is, when the first sub-transistor ST2-1 and the second sub-transistor ST2-2 are turned on, the gate electrode DTG and the second electrode of the driving transistor DT are connected to each other, and thus, the driving transistor DT is driven as a diode.

A gate electrode of the first sub-transistor ST2-1 may be connected to the k-th scan write line GWLk, the first electrode of the first sub-transistor ST2-1 may be connected to the second electrode of the second sub-transistor ST2-2 and the first node N1, and a second electrode of the first sub-transistor ST2-1 may be connected to the gate electrode DTG of the driving transistor DT. A gate electrode of the second sub-transistor ST2-2 may be connected to the k-th scan write line GWLk, a first electrode of the second sub-transistor ST2-2 may be connected to the second electrode of the driving transistor DT, and the second electrode of the second sub-transistor ST2-2 may be connected to the first electrode of the first sub-transistor ST2-1 and the first node N1.

Herein, the first node N1 may be a “connection node” between two sub-transistors constituting a dual transistor. For example, the first node N1 may be referred to as a connection node between the first sub-transistor ST2-1 and the second sub-transistor ST2-2. The first node N1 may connect the first electrode of the first sub-transistor ST2-1 and the second electrode of the second sub-transistor ST2-2 to each other. Meanwhile, the terms of the first node N1, the first electrode of the first sub-transistor ST2-1, and the second electrode of the second sub-transistor ST2-2 may be used interchangeably.

According to some embodiments, the first node N1 may be connected to the first lower line 110 of the driving transistor DT. Each of the first electrode of the first sub-transistor ST2-1 and the second electrode of the second sub-transistor ST2-2 may be connected to the first lower line 110 of the driving transistor DT. The first node N1 is connected to the first lower line 110, and it is thus possible to prevent a voltage of the connection node between the sub-transistors from changing according to a change in voltage of a signal line adjacent to the connection node. For example, the first node N1 is not floated and is connected to the first lower line 110, and it is thus possible to prevent a voltage of the first node N1 from changing according to a change in voltage of the k-th scan write line GWLk adjacent to the first node N1.

The third transistor ST3 may be formed as a dual transistor in which a third sub-transistor ST3-1 and a fourth sub-transistor ST3-2 are connected to each other in series. The third sub-transistor ST3-1 and the fourth sub-transistor ST3-2 are turned on by a k-th scan initialization signal of the k-th scan initialization line GILk to connect the gate electrode DTG of the driving transistor DT and the initialization voltage line VIL to each other. The gate electrode DTG of the driving transistor DT may be discharged to the initialization voltage Vini of the initialization voltage line VIL.

A gate electrode of the third sub-transistor ST3-1 may be connected to the k-th scan initialization line GILk, a first electrode of the third sub-transistor ST3-1 may be connected to the gate electrode DTG of the driving transistor DT, and a second electrode of the third sub-transistor ST3-1 may be connected to a first electrode of the fourth sub-transistor ST3-2 and a second node N2. A gate electrode of the fourth sub-transistor ST3-2 may be connected to the k-th scan initialization line GILk, the first electrode of the fourth sub-transistor ST3-2 may be connected to the second electrode of the third sub-transistor ST3-1 and the second node N2, and a second electrode of the fourth sub-transistor ST3-2 may be connected to the initialization voltage line VIL.

In FIG. 3, each of the second electrode of the third sub-transistor ST3-1 and the first electrode of the fourth sub-transistor ST3-2 may be referred to as the second node N2. Herein, the second node N2 may be a “connection node” between two sub-transistors constituting a dual transistor. For example, the second node N2 may be referred to as a connection node between the third sub-transistor ST3-1 and the fourth sub-transistor ST3-2. The second node N2 may connect the second electrode of the third sub-transistor ST3-1 and the first electrode of the fourth sub-transistor ST3-2 to each other. Meanwhile, the terms of the second node N2, the second electrode of the third sub-transistor ST3-1, and the first electrode of the fourth sub-transistor ST3-2 may be used interchangeably.

The fourth transistor ST4 is turned on by a k+1-th scan write signal of the k+1-th scan write line GWLk+1 to connect the anode electrode of the light emitting element LE and the initialization voltage line VIL to each other. The anode electrode of the light emitting element LE may be discharged to the initialization voltage Vini. A gate electrode of the fourth transistor ST4 is connected to k+1-th scan write line GWLk+1, the first electrode of the fourth transistor ST4 is connected to the anode electrode of the light emitting element LE, and a second electrode of the fourth transistor ST4 is connected to the initialization voltage line VIL.

The fifth transistor ST5 is turned on by a k-th emission signal of the k-th emission line Elk to connect the first electrode of the driving transistor DT and the first driving voltage line VDDL to each other. A gate electrode of the fifth transistor ST5 is connected to the k-th emission line Elk, a first electrode of the fifth transistor ST5 is connected to the first driving voltage line VDDL, and a second electrode of the fifth transistor ST5 is connected to the first electrode of the driving transistor DT.

The sixth transistor ST6 is connected between the second electrode of the driving transistor DT and the anode electrode of the light emitting element LE. The sixth transistor ST6 is turned on by the k-th emission signal of the k-th emission line Elk to connect the second electrode of the driving transistor DT to the anode electrode of the light emitting element LE to each other. A gate electrode of the sixth transistor ST6 is connected to the k-th emission line Elk, a first electrode of the sixth transistor ST6 is connected to the second electrode of the driving transistor DT, and the second electrode of the sixth transistor ST6 is connected to the anode electrode of the light emitting element LE. When both the fifth transistor ST5 and the sixth transistor ST6 are turned on, the driving current Ids may be supplied to the light emitting element LE.

The capacitor Cst is formed between the gate electrode DTG of the driving transistor DT and the first driving voltage line VDDL. One electrode of the capacitor Cst may be connected to the gate electrode DTG of the driving transistor DT, and the other electrode of the capacitor CS may be connected to the first driving voltage line VDDL.

When the first electrode of each of the first to sixth transistors ST1, ST2, ST3, ST4, ST5, and ST6 and the driving transistor DT is a source electrode, the second electrode of each of the first to sixth transistors ST1, ST2, ST3, ST4, ST5, and ST6 and the driving transistor DT may be a drain electrode. Alternatively, when the first electrode of each of the first to sixth transistors ST1, ST2, ST3, ST4, ST5, and ST6 and the driving transistor DT is a drain electrode, the second electrode of each of the first to sixth transistors ST1, ST2, ST3, ST4, ST5, and ST6 and the driving transistor DT may be a source electrode.

An active layer of each of the first to sixth transistors ST1, ST2, ST3, ST4, ST5, and ST6 and the driving transistor DT may be formed of any one of polysilicon, amorphous silicon, and an oxide semiconductor. When the active layer of each of the first to sixth transistors ST1, ST2, ST3, ST4, ST5, and ST6 and the driving transistor DT is formed of the polysilicon, a process for forming the active layer may be a low temperature polysilicon (LTPS) process.

In addition, it has been mainly described in FIG. 3 that each of the first to sixth transistors ST1, ST2, ST3, ST4, ST5, and ST6 and the driving transistor DT is formed as a P-channel metal oxide semiconductor field effect transistor (MOSFET), but embodiments according to the present disclosure are not limited thereto, and each of the first to sixth transistors ST1, ST2, ST3, ST4, ST5, and ST6 and the driving transistor DT may also be formed as an N-channel MOSFET. When each of the first to sixth transistors ST1, ST2, ST3, ST4, ST5, and ST6 and the driving transistor DT is formed as the N-channel MOSFET, a timing diagram of FIG. 4 needs to be modified so as to match characteristics of the N-channel MOSFET.

The first driving voltage of the first driving voltage line VDDL, the second driving voltage of the second driving voltage line VSSL, and the initialization voltage Vini of the initialization voltage line VIL may be set in consideration of characteristics of the driving transistor DT, characteristics of the light emitting element LE, and the like. For example, a voltage difference between the data voltage Vdata supplied to the source electrode of the driving transistor DT and the initialization voltage Vini may be set to be greater than the threshold voltage Vth of the driving transistor DT.

Figure 4:
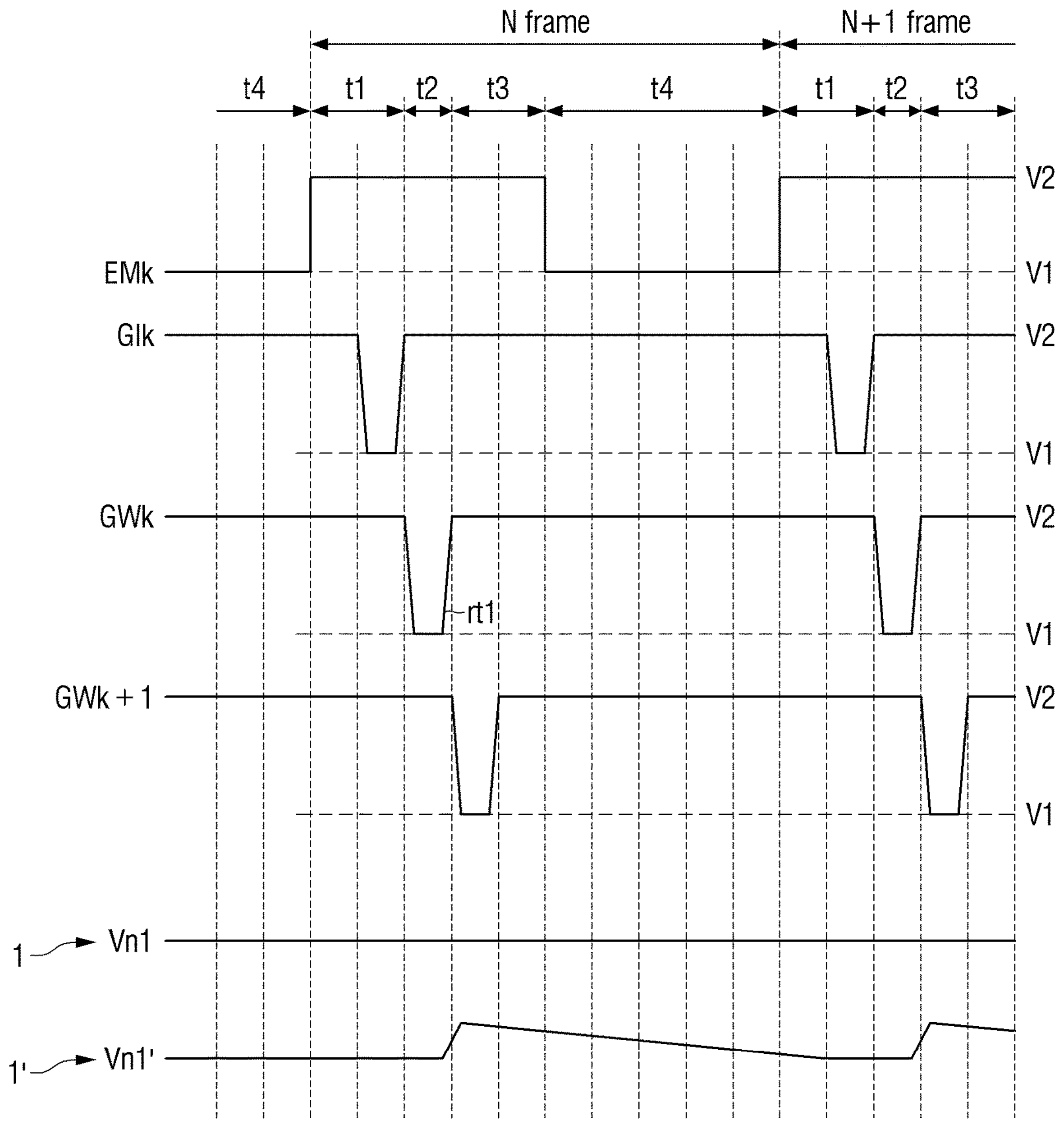
FIG. 4 is waveform diagrams illustrating a k-th emission signal, a k-th scan initialization signal, a k-th scan write signal, a k+1-th scan write signal, and a first node voltage applied to the sub-pixel according to some embodiments.

FIG. 4 is waveform diagrams illustrating a k-th emission signal, a k-th scan initialization signal, a k-th scan write signal, a k+1-th scan write signal, and a first node voltage applied to the sub-pixel according to some embodiments.

Referring to FIG. 4 in conjunction with FIG. 3, the k-th scan initialization signal Gik applied to the k-th scan initialization line GILk is a signal for controlling turn-on and turn-off of the third transistor ST3. The k-th scan write signal GWk applied to the k-th scan write line GWLk is a signal for controlling turn-on and turn-off of each of the first transistor ST1 and the second transistor ST2. The k+1-th scan write signal GWk+1 applied to the k+1-th scan write line GWLk+1 is a signal for controlling turn-on and turn-off of the fourth transistor ST4. The k-th emission signal Emk applied to the k-th emission line Elk is a signal for controlling the fifth transistor ST5 and the sixth transistor ST6. A first voltage Vn1 is a voltage of the first node N1 in the display device 1 in which the first lower line 110 is connected to the first node N1 according to some embodiments. A comparison voltage Vn1' is a voltage of the first node N1 in a display device 1' according to a comparative example to which the first lower line 110 is not connected to the first node N1.

The k-th scan initialization signal Gik, the k-th scan write signal GWk, the k+1-th scan write signal GWk+1, and the k-th emission signal Emk may be generated with one frame period as a cycle. One frame period may be divided into first to fourth periods t1 to t4. The first period t1 is a period for initializing the gate electrode DTG of the driving transistor DT, the second period t2 is a period for supplying the data voltage Vdata to the gate electrode DTG of the driving transistor DT and sampling the threshold voltage Vth of the driving transistor DT, the third period t3 is a period for initializing the anode electrode of the light emitting element LE, and the fourth period t4 is a period for emitting light from the light emitting element LE.

The k-th scan initialization signal Gik, the k-th scan write signal GWk, and the k+1-th scan write signal GWk+1 may be sequentially output as a first gate voltage V1 during the first to third periods t1, t2, and t3. For example, the k-th scan initialization signal Gik may have the first gate voltage V1 during the first period t1 and have a second gate voltage V2 during the other periods. The k-th scan write signal GWk may have the first gate voltage V1 during the second period t2 and have the second gate voltage V2 during the other periods. The k+1-th scan write signal GWk+1 may have the first gate voltage V1 during the third period t3 and have the second gate voltage V2 during the other periods.

The k-th emission signal Emk may have the first gate voltage V1 during the fourth period t4 and have the second gate voltage V2 during the other periods.

It has been illustrated in FIG. 4 that each of the first period t1, the second period t2, and the third period t3 is one horizontal period. One horizontal period indicates a period in which the data voltage is supplied to each of the sub-pixels SP connected to a certain scan line of the display panel 10, and may thus be defined as one horizontal line scan period. The data voltages may be supplied to the data lines in synchronization with the first gate voltage V1, which is a gate-on voltage of each of the scan signals.

The first gate voltage V1 corresponds to a turn-on voltage capable of turning on each of the first to sixth transistors ST1, ST2, ST3, ST4, ST5, and ST6. The second gate voltage V2 corresponds to a turn-off voltage capable of turning off each of the first to sixth transistors ST1, ST2, ST3, ST4, ST5, and ST6. The first gate voltage V1 may be a gate low voltage, and the second gate voltage V2 may be a gate high voltage.

Figure 10:
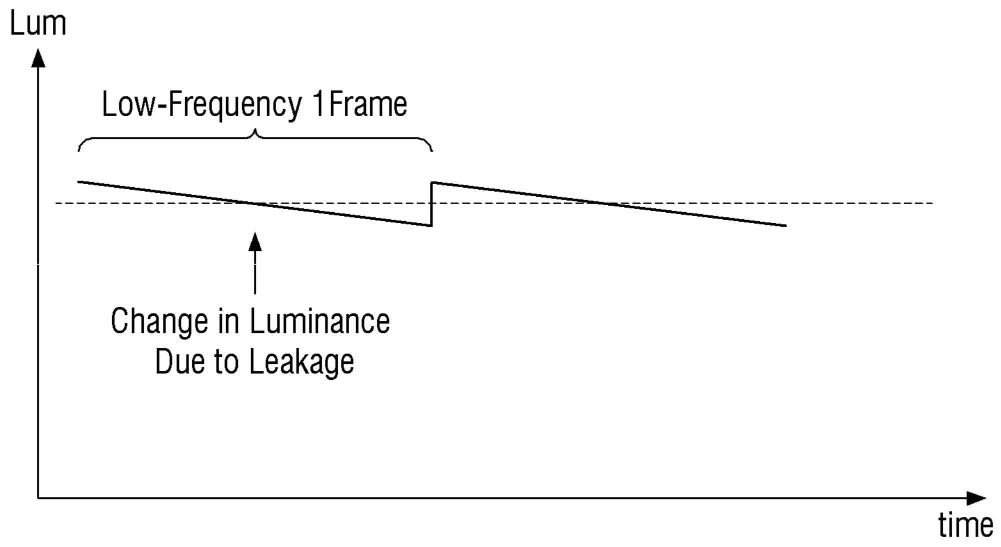
FIG. 10 is a graph illustrating a change in luminance due to a leakage current at the time of low frequency driving.
Figure 11:
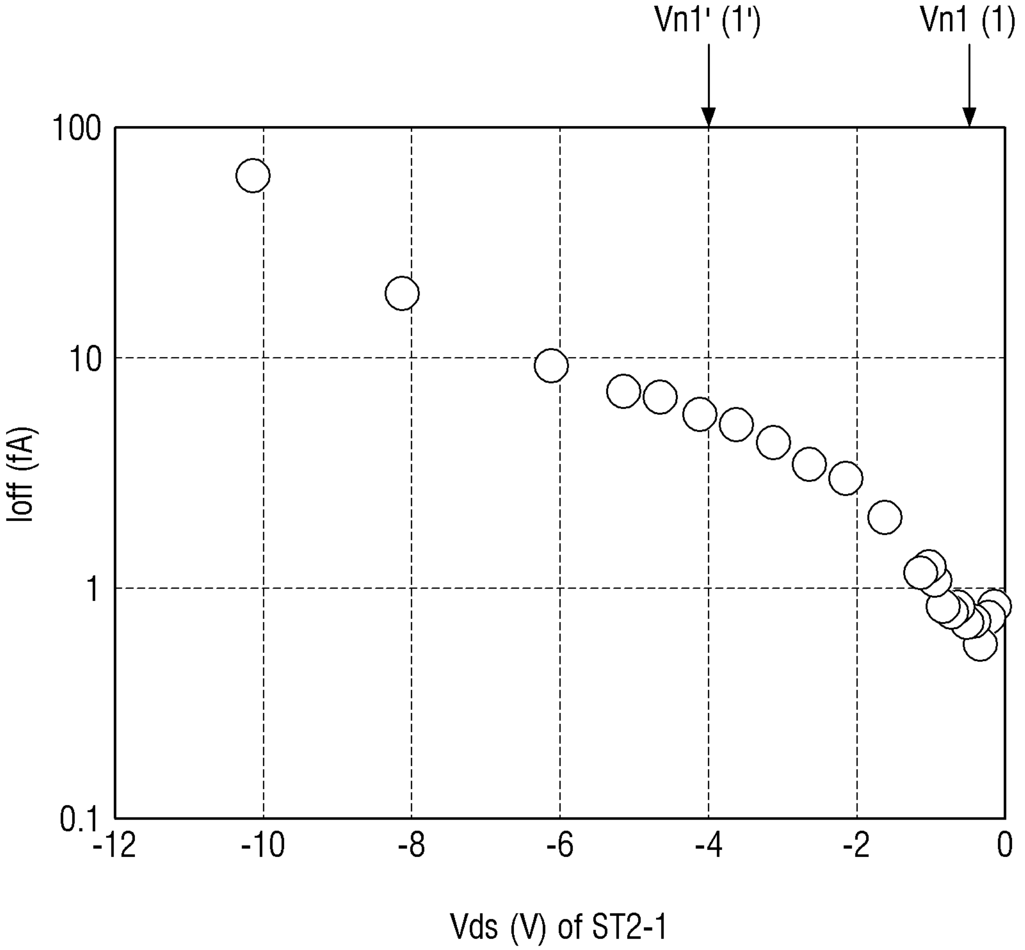
FIG. 11 is a graph illustrating a change in leakage current according to a change in voltage of a first node.

FIGS. 5 to 9 are circuit diagrams for describing a driving method of the sub-pixel during a first period, a second period, a third period, and a fourth period of FIG. 4. FIG. 10 is a graph illustrating a change in luminance due to a leakage current at the time of low frequency driving. FIG. 11 is a graph illustrating a change in leakage current according to a change in voltage of a first node.

Hereinafter, operations of the sub-pixel SP during the first to fourth periods t1 to t4 will be described in more detail with reference to FIGS. 5 to 9. Meanwhile, FIG. 7 is a circuit diagram of the sub-pixel SP for describing an operation in a rise time rt1 of the k-th scan write signal GWk between the second period t2 and the third period t3.

Figure 5:
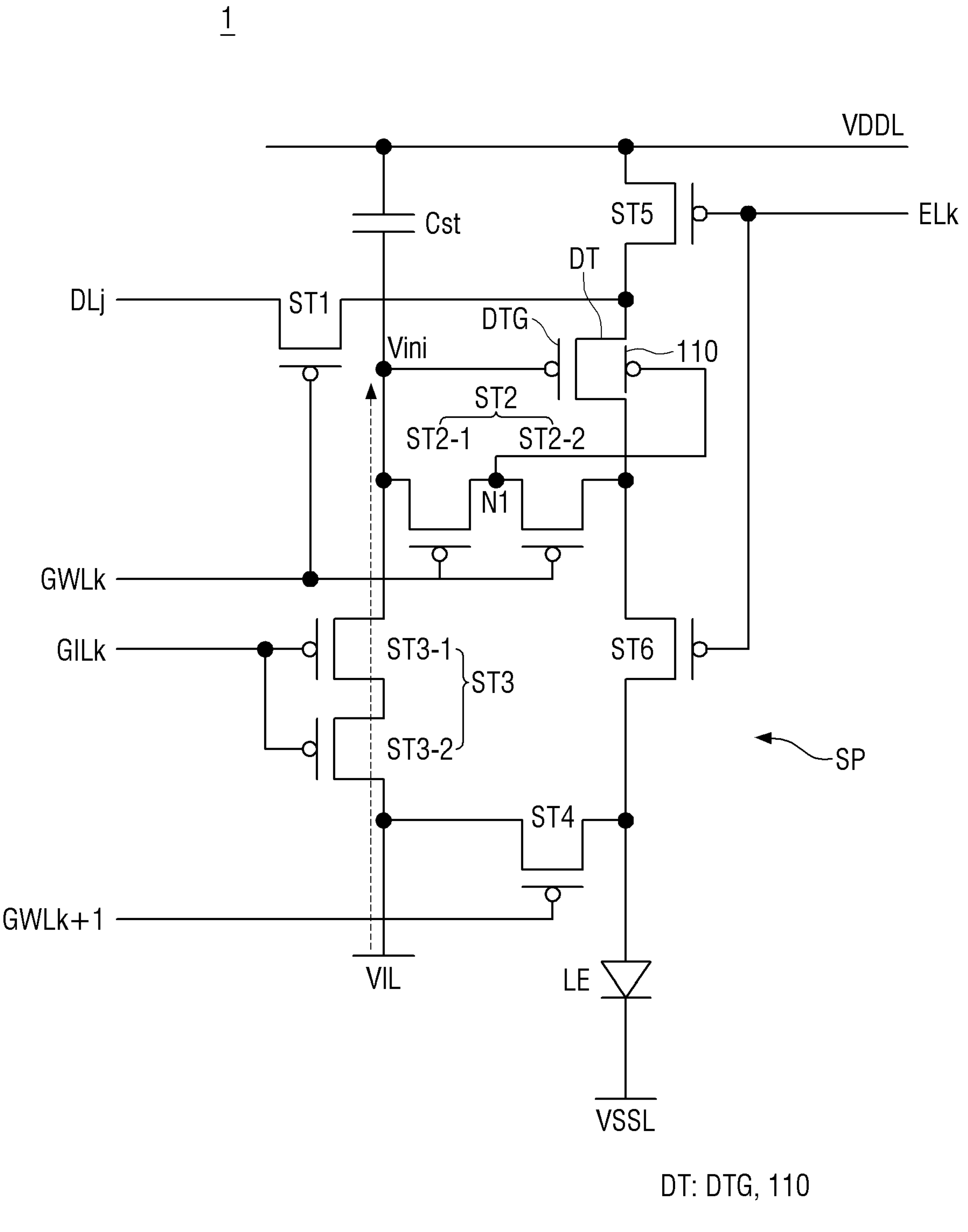
FIGS. 5 to 9 are circuit diagrams for describing a driving method of the sub-pixel during a first period, a second period, a third period, and a fourth period of FIG. 4.

First, referring to FIG. 5, during the first period t1, the k-th scan initialization signal Gik having the first gate voltage V1 is supplied to the k-th scan initialization line GILk. During the first period t1, the third transistor ST3 is turned on by the k-th scan initialization signal Gik having the first gate voltage V1. Due to the turn-on of the third transistor ST3, the gate electrode DTG of the driving transistor DT is initialized to the initialization voltage Vini of the initialization voltage line VIL.

Figure 6:
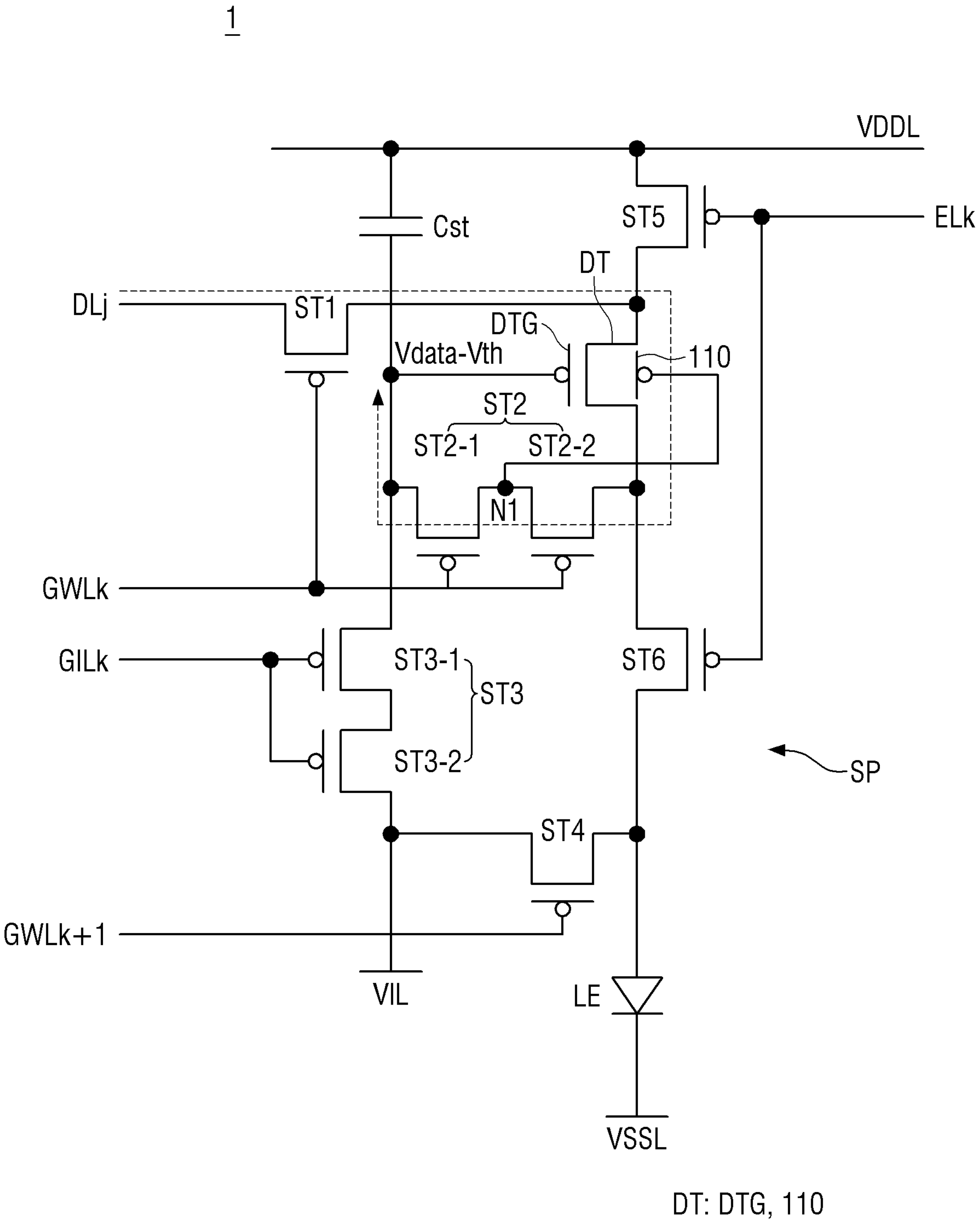
Figure 7:
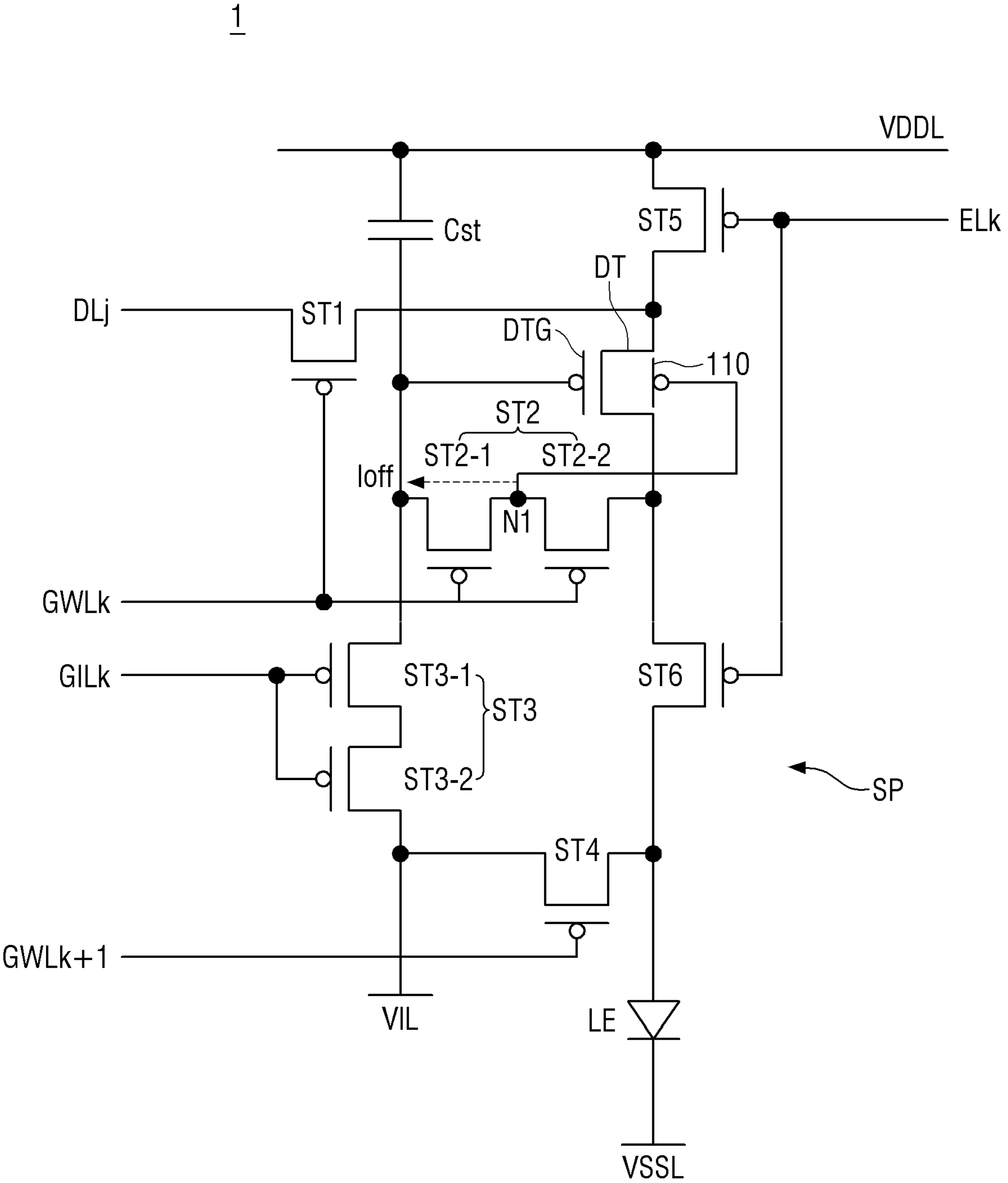

Then, referring to FIG. 6, during the second period t2, the k-th scan write signal GWk having the first gate voltage V1 is supplied to the k-th scan write line GWLk. During the second period t2, each of the first transistor ST1 and the second transistor ST2 is turned on by the k-th scan write signal GWk having the first gate voltage V1.

Due to the turn-on of the second transistor ST2, the gate electrode DTG and the second electrode of the driving transistor DT are connected to each other, and the driving transistor DT is driven as a diode. Due to the turn-on of the first transistor ST1, the data voltage Vdata is supplied to the first electrode of the driving transistor DT. As described above, the voltage difference (Vdata−Vini) between the data voltage Vdata and the initialization voltage Vini may be greater than the threshold voltage Vth of the driving transistor DT.

In this case, because the voltage difference (Vsg=Vdata−Vini) between the first electrode and the gate electrode DTG of the driving transistor DT is greater than the threshold voltage Vth, the driving transistor DT forms a current path until the voltage difference Vsg between the gate electrode DTG and the first electrode reaches the threshold voltage Vth. For this reason, a voltage of the gate electrode DTG and the second electrode of the driving transistor DT rises up to a difference voltage (Vdata−Vth) between the data voltage Vdata and the threshold voltage Vth of the driving transistor DT during the second period t2. "Vdata−Vth" may be stored in the capacitor Cst.

Then, referring to FIG. 7, a leakage current Ioff may be generated according to a change in the first voltage Vn1 of the first node N1 during the rise time rt1 of the k-th scan write signal GWk. The rise time rt1 of the k-th scan write signal GWk refers to a time during which the k-th scan write signal GWk rises from the first gate voltage V1 to the second gate voltage V2. For example, when the first gate voltage V1 is −7 V and the second gate voltage V2 is 7 V, a voltage of the k-th scan write signal GWk may increase by 14 V during the rise time rt1.

In the display device 1' according to a comparative example, when the first lower line 110 is not connected to the first node N1, the first node N1 may be an electrically floated node. Accordingly, the voltage of the first node N1 (i.e., the comparison voltage Vn1') may change according to a change in voltage of the k-th scan write line GWLk adjacent to the first node N1. For example, the voltage of the first node N1 may increase by about 5 V during the rise time rt1. As the voltage of the first node N1 increases, a voltage difference (Vn1'−Vg) is generated between the first node N1 and the gate electrode DTG of the driving transistor DT, and thus, the leakage current Ioff flowing from the first node N1 to the gate electrode DTG may be generated.

In the display device 1 according to some embodiments, when the first lower line 110 is connected to the first node N1, the voltage of the first node N1 (i.e., the first voltage Vn1) may be constant or insignificantly change in spite of the change in voltage of the k-th scan write line GWLk. For example, the voltage of the first node N1 may be constant in spite of an increase in the voltage of the k-th scan write signal GWk during the rise time rt1. Accordingly, a voltage difference (Vn1−Vg) between the first node N1 and the gate electrode DTG of the driving transistor DT becomes close to 0, and thus, the leakage current Ioff flowing from the first node N1 to the gate electrode DTG may be minimized.

Figure 8:
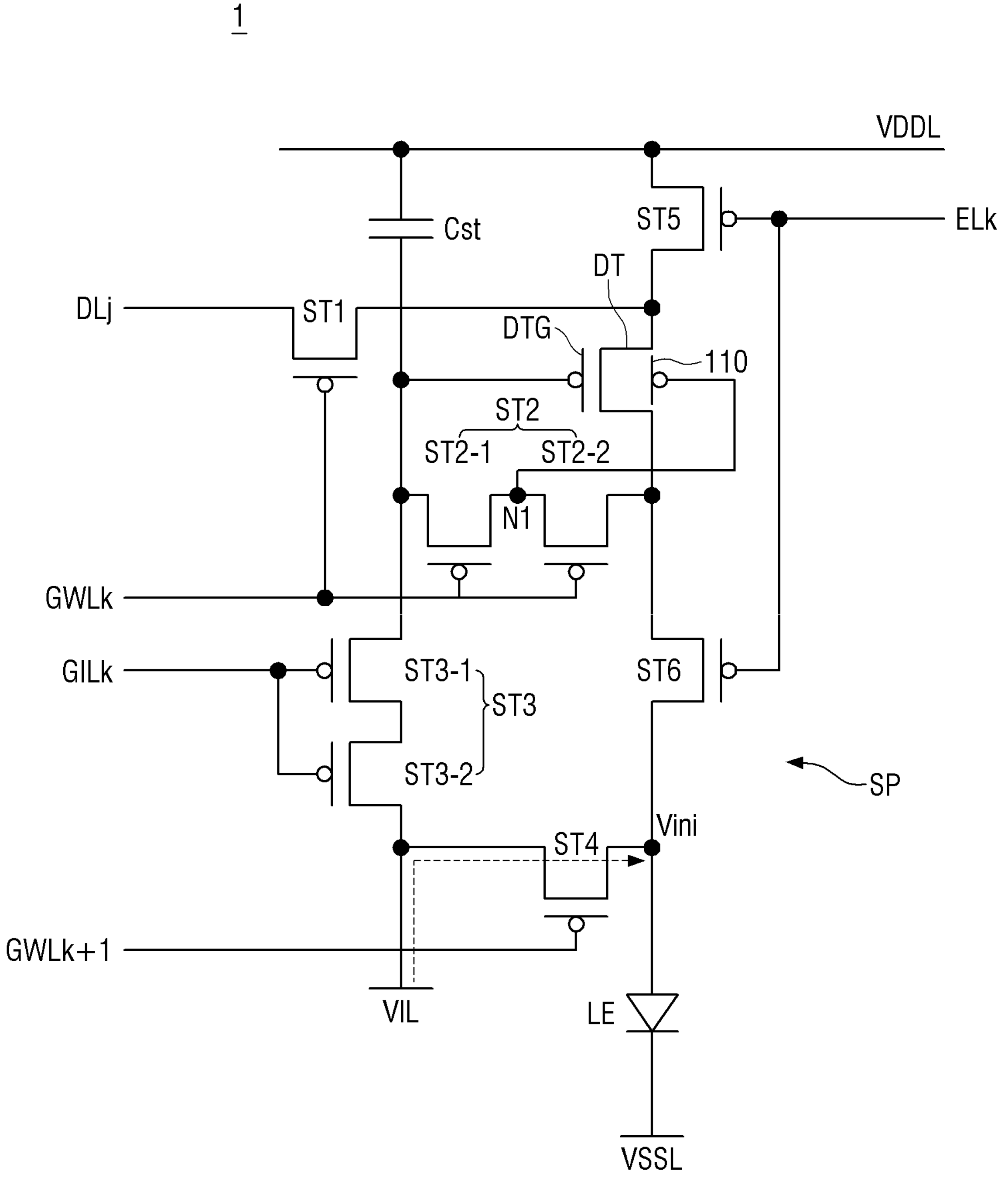

Then, referring to FIG. 8, during the third period t3, the k+1-th scan write signal GWk+1 having the first gate voltage V1 is applied to the k+1-th scan write line GWLk+1. During the third period t3, the fourth transistor ST4 is turned on by the k+1-th scan write signal GWk+1 having the first gate voltage V1. Due to the turn-on of the fourth transistor ST4, the anode electrode of the light emitting element LE is initialized to the initialization voltage Vini of the initialization voltage line VIL.

Figure 9:
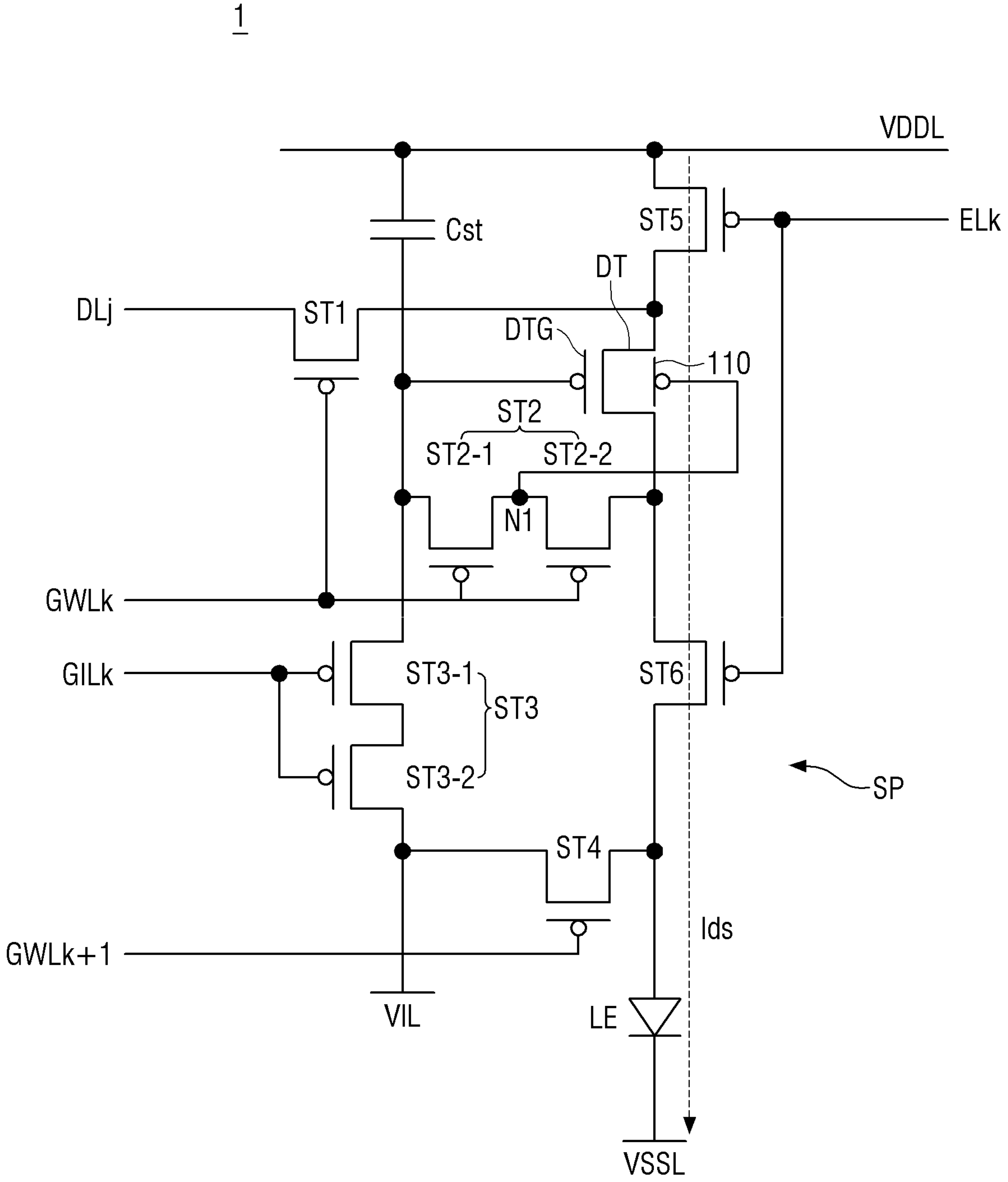

Then, referring to FIG. 9, during the fourth period t4, the k-th emission signal EMk having the first gate voltage V1 is supplied to the k-th emission line ELk. During the fourth period t4, each of the fifth transistor ST5 and the sixth transistor ST6 is turned on by the k-th emission signal EMk having the first gate voltage V1.

Due to the turn-on of the fifth transistor ST5, the first electrode of the driving transistor DT is connected to the first driving voltage line VDDL. Due to the turn-on of the sixth transistor ST6, the second electrode of the driving transistor DT is connected to the anode electrode of the light emitting element LE.

When the fifth transistor ST5 and the sixth transistor ST6 are turned on, the driving current Ids flowing according to the voltage of the gate electrode DTG of the driving transistor DT may be supplied to the light emitting element LE. The driving current Isd may be defined as represented in Equation 2.

$$Ids=k'\times(\mathrm{ELVDD}-(V\mathrm{data}-Vth)-Vth)^2 \quad \text{Equation 2}$$

Here, k' refers to a proportional coefficient determined by a structure and physical characteristics of the driving transistor DT, Vth refers to the threshold voltage of the driving transistor DT, ELVDD refers to the first driving voltage of the first driving voltage line VDDL, and Vdata refers to the data voltage. A gate voltage of the driving transistor DT is (Vdata−Vth), and a voltage of the first electrode of the driving transistor DT is ELVDD. When Equation 2 is rearranged, Equation 3 is derived.

$$Ids=k'\times(\mathrm{ELVDD}-V\mathrm{data})^2 \quad \text{Equation 3}$$

As a result, as represented in Equation 3, the driving current Ids does not depend on the threshold voltage Vth of the driving transistor DT. That is, the threshold voltage Vth of the driving transistor DT is compensated for.

As described above, as the voltage of the first node N1 decreases, the voltage difference between the first node N1 and the gate electrode DTG may decrease. As the voltage difference between the first node N1 and the gate electrode DTG decreases, the leakage current Ioff may decrease For example, referring to FIG. 11, as an absolute value of a drain-source voltage Vds of the first sub-transistor ST2-1 decreases, the leakage current Ioff decreases. The drain-source voltage Vds of the first sub-transistor ST2-1 may be the same as a difference between the voltage Vg of the gate electrode DTG of the driving transistor DT and the voltage of the first node N1.

As an absolute value of the difference between the voltage Vg of the gate electrode DTG and the voltage of the first node N1 decreases, the leakage current Ioff decreases. Accordingly, for example, in a case where the voltage of the first node N1 is the first voltage Vn1 an amount of the leakage current Ioff may decrease as compared with a case where the voltage of the first node N1 is the comparison voltage Vn1'. That is, when the first lower line 110 is connected to the first node N1, the leakage current Ioff of the display device 1 may be minimized.

For example, in a case of low frequency driving, a period during which the voltage Vg of the gate electrode DTG leaks due to the leakage current Ioff may be longer than in the case of high frequency driving. A change in the voltage Vg of the gate electrode DTG increases according to the leakage current Ioff, and thus, a change in luminance and a decrease in power consumption may be caused (see FIG. 10).

The change in luminance may be recognized as a flicker by a user. In the display device 1 according to some embodiments, by connecting the first lower line 110 to the first node N1, it is possible to keep the voltage of the first node N1 constant, and it is possible to prevent the voltage Vg of the gate electrode DTG from leaking due to the leakage current Ioff. The leakage current Ioff decreases, such that a flickering phenomenon caused by the change in luminance of the display device 1 may be improved, and power consumption may be improved. A frequency of the low frequency driving may be 60 Hz or less, and a frequency of the high frequency driving may be higher than 60 Hz, but embodiments according to the present disclosure are not limited thereto.

Hereinafter, the display device 1 according to some embodiments in which the first lower line 110 is connected to the first node N1 will be described with reference to a layout diagram of the sub-pixel SP.

Figure 12:
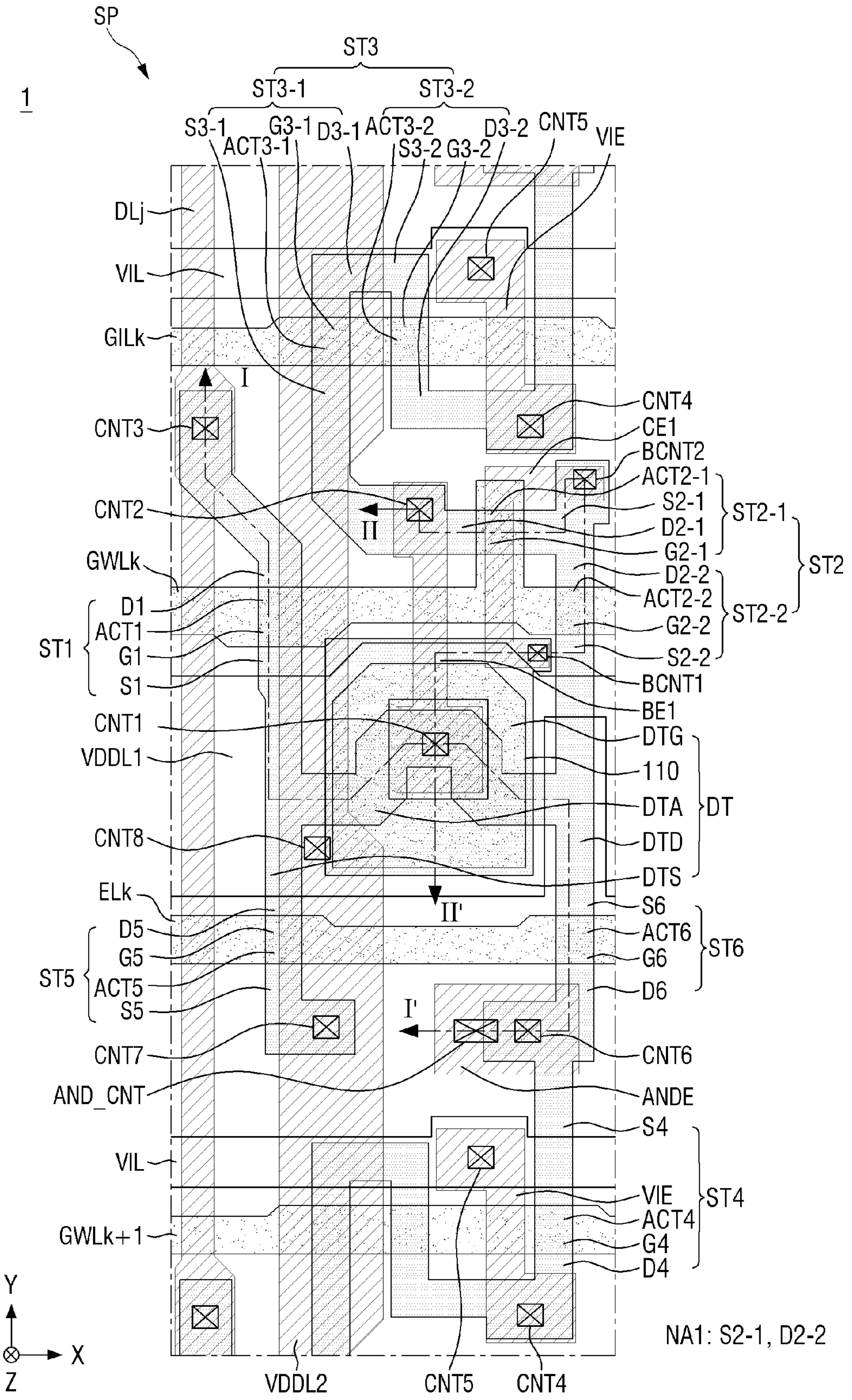
FIG. 12 is a layout diagram illustrating further details of the sub-pixel according to some embodiments.

FIG. 12 is a layout diagram illustrating further details of the sub-pixel according to some embodiments. In FIG. 12, a lower metal layer, an active layer, a first gate layer GTL1 (see FIG. 13), a second gate layer GTL2 (see FIG. 13), and a data metal layer DTL (see FIG. 13) of the sub-pixel SP are illustrated.

The active layer may include an active layer, a first electrode, and a second electrode of each of the driving transistor DT and the first to sixth transistors ST1, ST2, ST3, ST4, ST5, and ST6 The first gate layer GTL1 may include a gate electrode of each of the driving transistor DT and the first to sixth transistors ST1, ST2, ST3, ST4, ST5, and ST6, the k-th scan initialization line GILk, the k-th scan write line GWLk, the k-th emission line ELk, and the k+1-th scan write line GWLk+1. The second gate layer GTL2 may include a horizontal driving voltage line VDDL1 and the initialization voltage line VIL. The data metal layer DTL may include a first bridge electrode BE1, an initialization connection electrode VIE, the j-th data line DLj, a vertical driving voltage line VDDL2, an anode connection electrode ANDE, and a first connection electrode CE1. Meanwhile, the horizontal driving voltage line VDDL1 and the vertical driving voltage line VDDL2 may constitute the first driving voltage line VDDL.

The driving transistor DT may include an active layer DTA, a gate electrode DTG, a first electrode DTS, a second electrode DTD, and a first lower line 110. The active layer DTA of the driving transistor DT may overlap the gate electrode DTG of the driving transistor DT, and overlap the first lower line 110. The gate electrode DTG of the driving transistor DT may be located above the active layer DTA, and the first lower line 110 may be located below the active layer DTA.

The gate electrode DTG may be connected to the first bridge electrode BE1 through a first contact hole CNT1. The first bridge electrode BE1 may be connected to a second electrode D2-1 of the first sub-transistor ST2-1 through a second contact hole CNT2. The first bridge electrode BE1 may cross the k-th scan write line GWLk.

The first lower line 110 may be connected to the first connection electrode CE1 through a first bridge contact hole BCNT1. The first connection electrode CE1 may be connected to a first node area NA1 through a second bridge contact hole BCNT2. The first node area NA1 is an area between the first sub-transistor ST2-1 and the second sub-transistor ST2-2, and may include a first electrode S2-1 of the first sub-transistor ST2-1 and a second electrode D2-2 of the second sub-transistor ST2-2. That is, the first connection electrode CE1 may be connected to the first electrode S2-1 of the first sub-transistor ST2-1 and the second electrode D2-2 of the second sub-transistor ST2-2 through the second bridge contact hole BCNT2.

The first electrode DTS of the driving transistor DT may be connected to a first electrode S1 of the first transistor ST1. The second electrode DTD of the driving transistor DT may be connected to the first electrode S2-1 of the second sub-transistor ST2-1 and a first electrode S5 of the fifth transistor ST6.

The first transistor ST1 may include an active layer ACT1, a gate electrode G1, the first electrode S1, and a second electrode D1. The gate electrode G1 of the first transistor ST1 is a portion of the k-th scan write line GWLk, and may be an overlapping area between the active layer ACT1 of the first transistor ST1 and the k-th scan write line GWLk. The first electrode S1 of the first transistor ST1 may be connected to the first electrode DTS of the driving transistor DT. The second electrode D1 of the first transistor ST1 may be connected to the j-th data line DLj through a third contact hole CNT3.

The second transistor ST2 may be formed as a dual transistor. The second transistor ST2 may include the first sub-transistor ST2-1 and the second sub-transistor ST2-2.

The first sub-transistor ST2-1 may include an active layer ACT2-1, a gate electrode G2-1, the first electrode S2-1, and the second electrode D2-1. The gate electrode G2-1 of the first sub-transistor ST2-1 is a portion of the k-th scan write line GWLk, and may be an overlapping area between the active layer ACT2-1 of the first sub-transistor ST2-1 and the k-th scan write line GWLk. The first electrode S2-1 of the first sub-transistor ST2-1 may be connected to the second electrode D2-2 of the second sub-transistor ST2-2. The second electrode D2-1 of the first sub-transistor ST2-1 may be connected to the first bridge electrode BE1 through the second contact hole CNT2.

The second sub-transistor ST2-2 may include an active layer ACT2-2, a gate electrode G2-2, a first electrode S2-2, and the second electrode D2-2. The gate electrode G2-2 of the second sub-transistor ST2-2 is a portion of the k-th scan write line GWLk, and may be an overlapping area between the active layer ACT2-2 of the second sub-transistor ST2-2 and the k-th scan write line GWLk. The first electrode S2-2 of the second sub-transistor ST2-2 may be connected to the second electrode DTD of the driving transistor DT. The second electrode D2-2 of the second sub-transistor ST2-2 may be connected to the first electrode S2-1 of the first sub-transistor ST2-1.

The first node area NA1 may include the first electrode S2-1 of the first sub-transistor ST2-1 and the second electrode D2-2 of the second sub-transistor ST2-2. The first node area NA1 may correspond to the first node N1 in the circuit diagram of FIG. 3. The first node area NA1 may have an area expanded in a polygonal or circular shape at a point where a line extending in the first direction (X-axis direction) and a line extending in the second direction (Y-axis direction) cross each other. In the expanded area, the first node area NA1 may be connected to the first connection electrode CE1 through the second bridge contact hole BCNT2. The first connection electrode CE1 may cross the k-th scan write line GWLk. The first node area NA1 and the first lower line 110 may be connected to each other through the first connection electrode CE1.

The third transistor ST3 may be formed as a dual transistor. The third transistor ST3 may include the third sub-transistor ST3-1 and the fourth sub-transistor ST3-2.

The third sub-transistor ST3-1 may include an active layer ACT3-1, a gate electrode G3-1, a first electrode S3-1, and a second electrode D3-1. The gate electrode G3-1 of the third sub-transistor ST3-1 is a portion of the k-th scan initialization line GILk, and may be an overlapping area between the active layer ACT3-1 of the third sub-transistor ST3-1 and the k-th scan initialization line GILk. The first electrode S3-1 of the third sub-transistor ST3-1 may be connected to the first bridge electrode BE1 through the second contact hole CNT2. The second electrode D3-1 of the third sub-transistor ST3-1 may be connected to a first electrode S3-2 of the fourth sub-transistor ST3-2.

The fourth sub-transistor ST3-2 may include an active layer ACT3-2, a gate electrode G3-2, the first electrode S3-2, and a second electrode D3-2. The gate electrode G3-2 of the fourth sub-transistor ST3-2 is a portion of the k-th scan initialization line GILk, and may be an overlapping area between the active layer ACT3-2 of the fourth sub-transistor ST3-2 and the k-th scan initialization line GILk. The first electrode S3-2 of the fourth sub-transistor ST3-2 may be connected to the second electrode D3-1 of the third sub-transistor ST3-1. The second electrode D3 of the fourth sub-transistor ST3-2 may be connected to the initialization connection electrode VIE through a fourth contact hole CNT4.

The fourth transistor ST4 may include an active layer ACT4, a gate electrode G4, a first electrode S4, and a second electrode D4. The gate electrode G4 of the fourth transistor ST4 is a portion of the k+1-th scan write line GWLk+1, and may be an overlapping area between the active layer ACT4 of the fourth transistor ST4 and the k+1-th scan write line GWLk+1. The first electrode S4 of the fourth transistor ST4 may be connected to the anode connection electrode ANDE through a sixth contact hole CNT6. The anode connection electrode ANDE may be connected to a first electrode 171 (see FIG. 13) of a light emitting element LE to be described later through an anode contact hole AND_CNT. The second electrode D4 of the fourth transistor ST4 may be connected to an initialization connection electrode VIE of the next sub-pixel SP through the fourth contact hole CNT4. The initialization connection electrode VIE may be connected to the initialization voltage line VIL through a fifth contact hole CNT5. The initialization connection electrode VIE may be arranged to cross the k-th scan initialization line GILk.

The fifth transistor ST5 may include an active layer ACT5, a gate electrode G5, the first electrode S5, and a second electrode D5. The gate electrode G5 of the fifth transistor ST5 is a portion of the k-th emission line ELK and may be an overlapping area between the active layer ACT5 of the fifth transistor ST5 and the k-th emission line ELk. The first electrode S5 of the fifth transistor ST5 may be connected to the vertical driving voltage line VDDL2 through a seventh contact hole CNT7. The second electrode D5 of the fifth transistor ST5 may be connected to the first electrode DTS of the driving transistor DT.

The sixth transistor ST6 may include an active layer ACT6, a gate electrode G6, a first electrode S6, and a second electrode D6. The gate electrode G6 of the sixth transistor ST6 is a portion of the k-th emission line ELK and may be an overlapping area between the active layer ACT6 of the sixth transistor ST6 and the k-th emission line ELk. The first electrode S6 of the sixth transistor ST6 may be connected to the second electrode DTD of the driving transistor DT. The second electrode D6 of the sixth transistor ST6 may be connected to the anode connection electrode ANDE through the sixth contact hole CNT6.

A first capacitor electrode C1 of the capacitor Cst may be a portion of the second electrode DTD of the driving transistor DT, and a second capacitor electrode C2 of the capacitor Cst may be the horizontal driving voltage line VDDL1 overlapping the first electrode DTS and the second electrode DTD of the driving transistor DT. The horizontal driving voltage line VDDL1 may be connected to the vertical driving voltage line VDDL2 through an eighth contact hole CNT8. The horizontal driving voltage line VDDL1 may be arranged in the first direction (X-axis direction) parallel to the k-th scan write line GWLk, and the vertical driving voltage line VDDL2 may be arranged in the second direction (Y-axis direction) parallel to the j-th data line DLj.

According to some embodiments, the k-th scan write line GWLk may extend in the first direction X, and include a protrusion part at least partially protruding in the second direction Y. The k-th scan write line GWLk may extend in the first direction X to overlap the active layer ACT2-2 (or a second sub-channel) of the second sub-transistor ST2-2, and the protrusion part of the k-th scan write line GWLk may overlap the active layer ACT2-1 (or a first sub-channel) of the first sub-transistor ST2-1. A portion of the k-th scan write line GWLk extending in the first direction X may cross a portion of the first connection electrode CE1 extending in the second direction Y.

Figure 14:
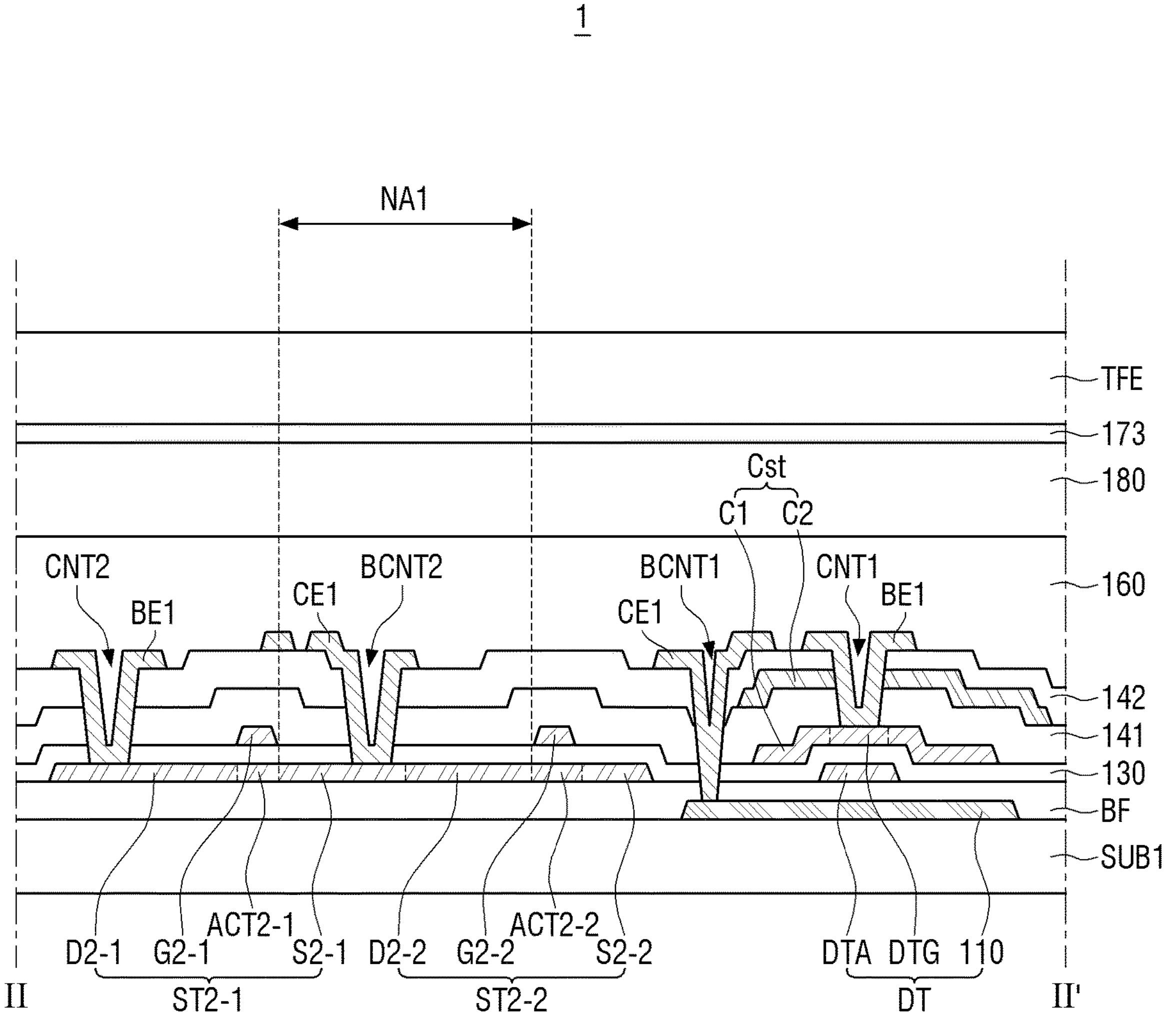
FIG. 14 is a cross-sectional view taken along the line II-II' of FIG. 12.

FIG. 13 is a cross-sectional view taken along line I-I' of FIG. 12. FIG. 14 is a cross-sectional view taken along line II-II' of FIG. 12.

Referring to FIGS. 13 and 14, a thin film transistor layer, a light emitting element layer, and an encapsulation layer TFE may be sequentially formed on a first substrate SUB1. The thin film transistor layer may include a plurality of conductive layers and a plurality of insulating layers to supply a signal for driving the light emitting element LE.

The thin film transistor layer includes a lower metal layer, a buffer film BF, an active layer, a gate insulating film 130, a first gate layer GTL1, a first interlayer insulating film 141, a second gate layer GTL2, a second interlayer insulating film 142, a data metal layer DTL, and a planarization film 160.

The lower metal layer may be located on the first substrate SUB1, and may be covered by the buffer film BF. The lower metal layer may include the first lower line 110. The first lower line 110 may overlap portions of the active layer DTA and the gate electrode DTG of the driving transistor DT. The first lower line 110 may be a shielding line blocking light introduced from the outside from being incident on the active layer DTA of the driving transistor DT through the first substrate SUB1 and blocking a potential of the first substrate SUB1 from changing due to a fluctuation in voltage applied to circuit elements. The first lower line 110 may be a sub-gate electrode or a bottom gate electrode of the driving transistor DT. The driving transistor DT may have a double gate electrode including the top gate electrode DTG and the first lower line 110.

The first lower line 110 may be connected to the first connection electrode CE1 through the first bridge contact hole BCNT1. The first connection electrode CE1 may be connected to the first electrode S2-1 of the first sub-transistor ST2-1 or the second electrode D2-2 of the second sub-transistor ST2-2 through the second bridge contact hole BCNT2. The first lower line 110 may be connected to the first electrode S2-1 of the first sub-transistor ST2-1 or the second electrode D2-2 of the second sub-transistor ST2-2 through the first connection electrode CE1. In other words, the first lower line 110 may be connected to the first node area NA1 through the first connection electrode CE1. The first lower line 110 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

The buffer film BF may be formed on one surface of the first substrate SUB1 and the first lower line 110. The buffer film BF may be formed on one surface of the first substrate SUB1 in order to protect thin film transistors and an organic light emitting layer 172 of the light emitting element layer from moisture permeated through the first substrate SUB1 vulnerable to moisture permeation. The buffer film BF may include a plurality of inorganic films that are alternately stacked. For example, the buffer film BF may be formed as multiple films in which one or more inorganic films of a silicon nitride layer, a silicon oxynitride layer, a silicon oxide layer, a titanium oxide layer, and an aluminum oxide layer are alternately stacked. The buffer film BF may be omitted.

The active layer may be formed on the first substrate SUB1 or the buffer film BF. The active layer may include polycrystalline silicon, single crystal silicon, low-temperature polycrystalline silicon, amorphous silicon, or an oxide semiconductor.

When the active layer is made of the polycrystalline silicon, the active layer may be doped with ions to have conductivity. Accordingly, the active layer may include the first electrodes and the second electrodes of the driving transistor DT and the first to sixth switching transistors ST1 to ST6 as well as the active layers of the driving transistor DT and the first to sixth switching transistors ST1 to ST6. For example, the active layer may include the active layer DTA, the first electrode DTS, and the second electrode DTD of the driving transistor DT.

The active layer may include the active layers ACT1, ACT2-1, ACT2-2, and ACT6, the first electrodes S1, S2-1, S2-2, and S6, and the second electrodes D1, D2-1, D2-2, and D6 of the first transistor ST1, the second transistors ST2-1 and ST2-2, and the sixth transistor ST6. Herein, the active layer DTA of the driving transistor DT may be referred to as a "first channel", and the active layers ACT2-1 and ACT2-2 of the second transistors T2-1 and ST2-2 may be referred to as a "second channel". The active layer ACT2-1 of the first sub-transistor ST2-1 may be referred to as a first sub-channel, and the active layer ACT2-2 of the second sub-transistor ST2-2 may be referred to as a second sub-channel.

The gate insulating film 130 may be formed on the active layer. The gate insulating film 130 may be formed as an inorganic film, for example, a silicon nitride layer, a silicon oxynitride layer, a silicon oxide layer, a titanium oxide layer, or an aluminum oxide layer.

The first gate layer GTL1 may be formed on the gate insulating film 130. The first gate layer GTL1 may include the gate electrodes of the driving transistor DT and the first to sixth switching transistors ST1 to ST6, the scan lines GILk, GWLk, and GWLk+1, and the emission line ELk. In addition, the first gate layer GTL1 may include the first capacitor electrode C1, which is one electrode of the capacitor Cst. For example, the first gate layer GTL1 may include the gate electrode DTG of the driving transistor DT and the gate electrodes G1, G2-1, G2-2, and G6 of the first transistor ST1, the second transistors ST2-1 and ST2-2, and the sixth transistor ST6. The gate electrode DTG may overlap the first lower line 110 and the first channel DTA.

The gate electrodes G1 of the first transistor ST1 and the gate electrodes G2-1 and G2-2 of the second transistors ST2-1 and ST2-2 may be portions of the k-th scan write line GWLk, and the gate electrode G6 of the sixth transistor ST6 may be a portion of the k-th emission line ELK but embodiments according to the present disclosure are not limited thereto. The k-th scan write line GWLk may overlap the active layers ACT2-1 and ACT2-2 of the second transistors ST2-1 and ST2-2 referred to as the second channel at least twice. Specifically, the first sub-channel ACT2-1 of the second channel may overlap the gate electrode G2-1 of the first sub-transistor ST2-1, and the second sub-channel ACT2-2 of the second channel may overlap the gate electrode G2-2 of the second sub-transistor ST2-2.

The first gate layer GTL1 may be formed as a single layer or a multiple layer made of any one of molybdenum (Mo), aluminum (Al), chromium (Cr), gold (Au), titanium (Ti), nickel (Ni), neodymium (Nd), and copper (Cu), or alloys thereof.

The first interlayer insulating film 141 may be formed on the first gate layer GTL1. The first interlayer insulating film 141 may be formed as an inorganic film, for example, a silicon nitride layer, a silicon oxynitride layer, a silicon oxide layer, a titanium oxide layer, or an aluminum oxide layer. The first interlayer insulating film 141 may include a plurality of inorganic films.

The second gate layer GTL2 may be formed on the first interlayer insulating film 141. The second gate layer GTL2 may include the second capacitor electrode C2, which is the other electrode of the capacitor Cst. The second capacitor electrode C2 may be integrated with the horizontal driving voltage line VDDL1 (see FIG. 12). The second gate layer GTL2 may be formed as a single layer or a multiple layer made of any one of molybdenum (Mo), aluminum (Al), chromium (Cr), gold (Au), titanium (Ti), nickel (Ni), neodymium (Nd), and copper (Cu), or alloys thereof.

The second interlayer insulating film 142 may be formed on the second gate layer GTL2. The second interlayer insulating film 142 may be formed as an inorganic film, for example, a silicon nitride layer, a silicon oxynitride layer, a silicon oxide layer, a titanium oxide layer, or an aluminum oxide layer. The second interlayer insulating film 142 may include a plurality of inorganic films.

The data metal layer DTL may be formed on the second interlayer insulating film 142. The data metal layer DTL may include the j-th data line DLj, the vertical driving voltage line VDDL2, the first bridge electrode BE1, the anode connection electrode ANDE, and the first connection electrode CE1. The j-th data line DLj may be connected to the first electrode S1 of the first transistor ST1 through the third contact hole CNT3. The first bridge electrode BE1 may be connected to the gate electrode DTG of the driving transistor DT through the first contact hole CNT1, and may be connected to the second electrode D2-1 of the first sub-transistor ST2-1 through the second contact hole CNT2. The anode connection electrode ANDE may be connected to the second electrode D6 of the sixth transistor ST6 through the sixth contact hole CNT6. The anode connection electrode ANDE may be connected to the first electrode 171 of the light emitting element LE through the anode contact hole AND_CNT. The first connection electrode CE1 may be connected to the first node area NA1 through the first bridge contact hole BCNT1, and may be connected to the first lower line 110 through the second bridge contact hole BCNT2.

The data metal layer DTL may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

The planarization film 160 for planarizing a step caused by the active layer, the first gate layer GTL1, the second gate layer GTL2, and the data metal layer DTL may be formed on the data metal layer DTL. The planarization film 160 may be formed as an organic film made of an acrylic resin, an epoxy resin, a phenolic resin, a polyamide resin, a polyimide resin, or the like.

The first contact hole CNT1 may be a hole penetrating through the first interlayer insulating film 141 and the second interlayer insulating film 142 to expose the gate electrode DTG of the driving transistor DT. The first bridge electrode BE1 may be connected to the gate electrode DTG of the driving transistor DT through the first contact hole CNT1.

The second contact hole CNT2 may be a hole penetrating through the gate insulating film 130, the first interlayer insulating film 141, and the second interlayer insulating film 142 to expose the second electrode D2-1 of the first sub-transistor ST2-1. The first bridge electrode BE1 may be connected to the second electrode D2-1 of the first sub-transistor ST2-1 through the second contact hole CNT2.

The third contact hole CNT3 may be a hole penetrating through the gate insulating film 130, the first interlayer insulating film 141, and the second interlayer insulating film 142 to expose the first electrode S1 of the first transistor ST1. The j-th data line DLj may be connected to the first electrode S1 of the first transistor ST1 through the third contact hole CNT3.

The sixth contact hole CNT6 may be a hole penetrating through the gate insulating film 130, the first interlayer insulating film 141, and the second interlayer insulating film 142 to expose the second electrode D6 of the sixth transistor ST6. The anode connection electrode ANDE may be connected to the second electrode D6 of the sixth transistor ST6 through the sixth contact hole CNT6. The anode contact hole AND_CNT may be a hole penetrating through the planarization film 160 to expose the anode connection electrode ANDE.

The first bridge contact hole BCNT1 may be a hole penetrating through the buffer film BF, the gate insulating film 130, the first interlayer insulating film 141, and the second interlayer insulating film 142 to expose the first lower line 110. The first connection electrode CE1 may be connected to the first lower line 110 through the first bridge contact hole BCNT1.

The second bridge contact hole BCNT2 may be a hole penetrating through the gate insulating film 130, the first interlayer insulating film 141, and the second interlayer insulating film 142 to expose the first electrode S2-1 of the first sub-transistor ST2-1 and the second electrode D2-2 of the second sub-transistor ST2-2. The second bridge contact hole BCNT2 may be a hole exposing the first node area NA1. The first connection electrode CE1 may be connected to the first electrode S2-1 of the first sub-transistor ST2-1 and the second electrode D2-2 of the second sub-transistor ST2-2 through the second bridge contact hole BCNT2.

The light emitting element layer is formed on the thin film transistor layer. The light emitting element layer includes light emitting elements LE and a pixel defining film 180.

The light emitting elements LE and the pixel defining film 180 are formed on the planarization film 160. Each of the light emitting elements LE may include a first electrode 171, an organic light emitting layer 172, and a second electrode 173.

The first electrode 171 may be formed on the planarization film 160. The first electrode 171 may be connected to the anode connection electrode ANDE through the anode contact hole AND_CNT penetrating through the planarization film 160.

In a top emission structure in which light is emitted toward the second electrode 173 based on the organic light emitting layer 172, the first electrode 171 may be formed of a metal material having high reflectivity, such as a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The pixel defining film 180 may be formed to partition the first electrode 171 on the planarization film 160 in order to define an emission area EA. The pixel defining film 180 may be formed to cover an edge of the first electrode 171. The pixel defining film 180 may be formed as an organic film made of an acrylic resin, an epoxy resin, a phenolic resin, a polyamide resin, a polyimide resin, or the like.

The emission area EA refers to an area in which the first electrode 171, the organic light emitting layer 172, and the second electrode 173 are sequentially stacked and holes from the first electrode 171 and electrons from the second electrode 173 are combined with each other in the organic light emitting layer 172 to emit light.

The organic light emitting layer 172 is formed on the first electrode 171 and the pixel defining film 180. The organic light emitting layer 172 may include an organic material to emit light of a color (e.g., a set or predetermined color). For example, the organic light emitting layer 172 may include a hole transporting layer, an organic material layer, and an electron transporting layer. The organic light emitting layer 172 may emit red, green, or blue light.

The second electrode 173 is formed on the organic light emitting layer 172. The second electrode 173 may be formed to cover the organic light emitting layer 172. The second electrode 173 may be a common electrode formed in common for each pixel. The second electrode 173 may be formed of a transparent conductive material (TCO) such as ITO or indium zinc oxide (IZO) capable of transmitting light therethrough or a semi-transmissive conductive material such as magnesium (Mg), silver (Ag), or an alloy of magnesium (Mg) and silver (Ag).

The encapsulation layer TFE may be formed on the light emitting element layer. The encapsulation layer TFE may include at least one inorganic film in order to prevent oxygen or moisture from penetrating into the light emitting element layer. In addition, the encapsulation layer TFE may include at least one organic film in order to protect the light emitting element layer from foreign materials such as dust.

In the display device 1 according to some embodiments, the first electrode S2-1 of the first sub-transistor ST2-1 and the second electrode D2-2 of the second sub-transistor ST2-2 of the first node area NA1 may be connected to the first lower line 110 by the first connection electrode CE1.

The first electrode S2-1 of the first sub-transistor ST2-1 and the second electrode D2-2 of the second sub-transistor ST2-2 are connected to the first lower line 110, and thus, a phenomenon in which the first node area NA1 is affected by a change in voltage of the scan line or the emission line may be minimized. According to some embodiments, the gate electrodes G2-1 and G2-2 of the first sub-transistor ST2-1 and the second sub-transistor ST2-2 may be portions of the k-th scan write line GWLk. The first node area NA1 is connected to the first lower line 110, and it is thus possible to prevent a voltage of the first electrode S2-1 of the first sub-transistor ST2-1 and the second electrode D2-2 of the second sub-transistor ST2-2 from changing even though the k-th scan write signal GWk changes. The voltage of the first node area NA1 is kept constant, and it is thus possible to prevent the voltage Vg of the gate electrode DTG from leaking due to the leakage current Ioff. The leakage current Ioff is minimized, such that a flickering phenomenon caused by a change in luminance of the display device 1 may be improved, and power consumption may be improved.

Figure 15:
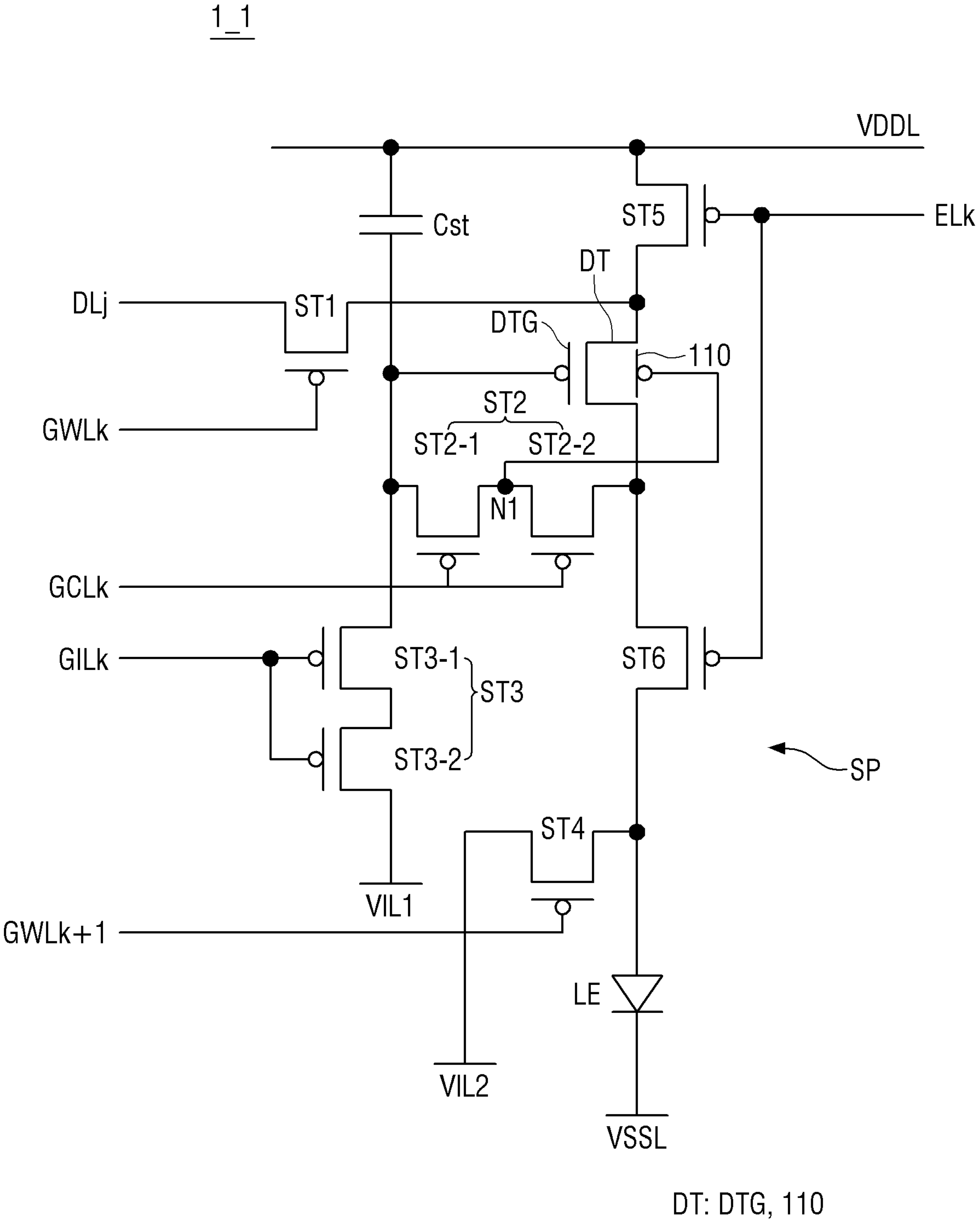
FIG. 15 is a circuit diagram illustrating a sub-pixel according to some embodiments.

FIG. 15 is a circuit diagram illustrating a sub-pixel according to some embodiments.

A display device 1_1 according to some embodiments as illustrated in FIG. is different from the display device according to the previous embodiments in that the gate electrode of the second transistor ST2 is connected to a k-th scan control line GCLk, the second electrode of the third transistor ST3 is connected to a first initialization voltage line VIL1, and the second electrode of the fourth transistor ST4 is connected to a second initialization voltage line VIL2. The k-th scan control line GCLk is some of the scan lines, and may be turned on simultaneously with the k-th scan write line GWLk, but embodiments according to the present disclosure are not limited thereto. The k-th scan control line GCLk is some of the scan lines, and may be turned on separately from the k-th scan write line GWLk. A turn-on cycle of the k-th scan control line GCLk may be longer than a turn-on cycle of the k-th scan write line GWLk. The first initialization voltage line VIL1 and the second initialization voltage line VIL2 may have different voltages or have the same voltage.

The present embodiments are the same as the previous embodiments in that the first node N1 is connected to the first lower line 110, which is the bottom gate electrode of the driving transistor DT. According to some embodiments, as illustrated in FIGS. 12 to 14, the first electrode S2-1 of the first sub-transistor ST2-1 and the second electrode D2-2 of the second sub-transistor ST2-2 may be connected to the first lower line 110 by the first connection electrode CE1 of the data conductive layer DTL.

In the present embodiments, the gate electrode G2-1 of the first sub-transistor ST2-1 and the gate electrode G2-2 of the second sub-transistor ST2-2 may be connected to the k-th scan control line GCLk. In cross-sectional view, the gate electrodes G2-1 and G2-2 of the first sub-transistor ST2-1 and the second sub-transistor ST2-2 may be portions of the k-th scan control line GCLk. The first node N1 is connected to the first lower line 110, and it is thus possible to prevent a voltage of the first node N1 from changing according to a change in voltage of the k-th scan control line GCLk. The voltage of the first node N1 is kept constant, and it is thus possible to prevent the voltage Vg of the gate electrode DTG from leaking due to the leakage current Ioff. The leakage current Ioff is minimized, such that a flickering phenomenon caused by a change in luminance of the display device 1_1 may be improved, and power consumption may be improved.

Hereinafter, a display device 1_2 according to some embodiments will be described in more detail.

Figure 16:
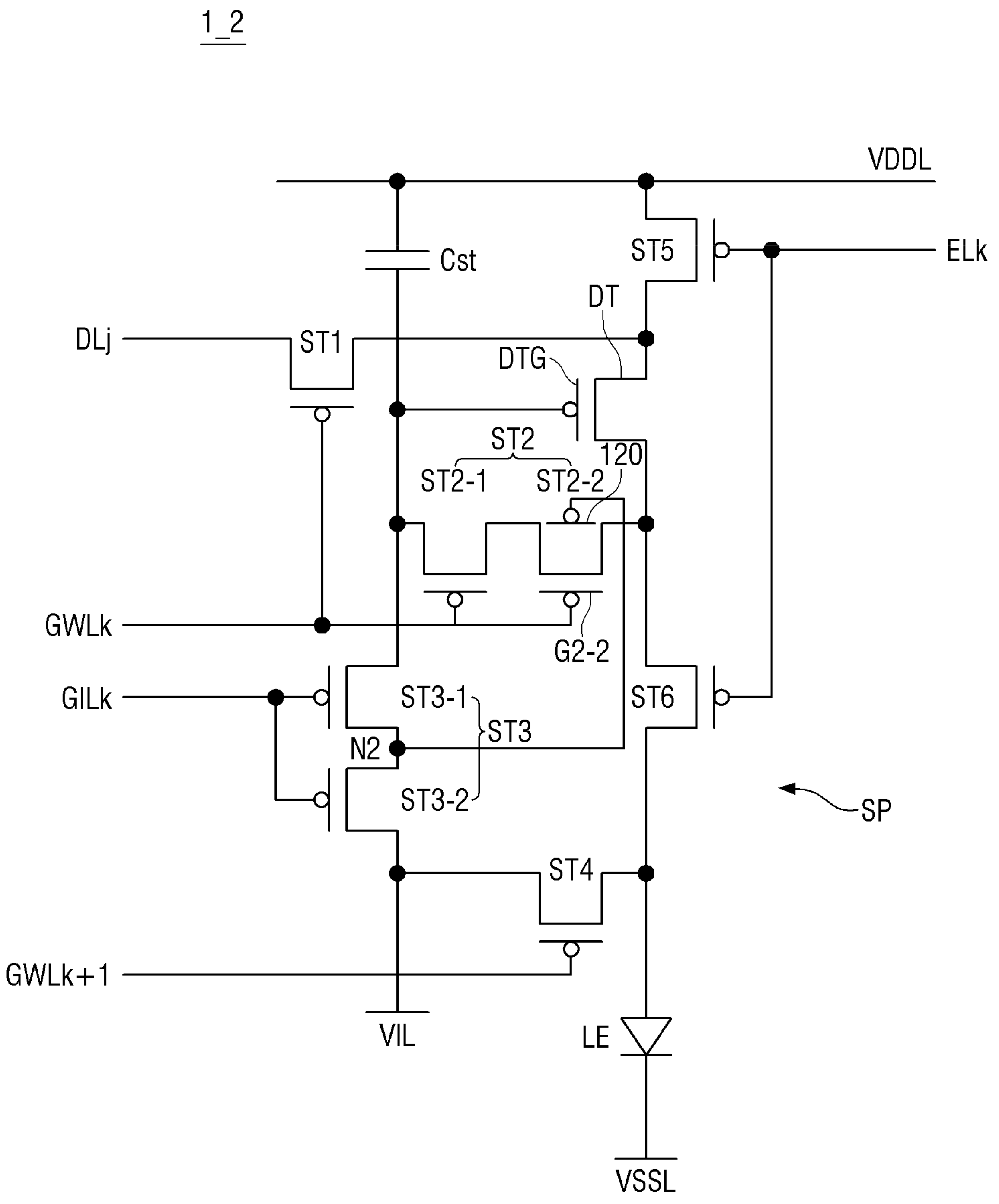
FIG. 16 is a circuit diagram illustrating a sub-pixel according to some embodiments.

FIG. 16 is a circuit diagram illustrating a sub-pixel according to some embodiments.

A sub-pixel SP according to the present embodiments in which a connection between the first node N1 and the first lower line 110 is omitted and the second node N2 and a second lower line 120 are connected to each other will be described. According to some embodiments, in the sub-pixel SP, the first node N1 and the first lower line 110 may be connected to each other, and the second node N2 and the second lower line 120 may also be connected to each other. Hereinafter, some overlapping description may be omitted, and contents different from those described above will be mainly described.

The second sub-transistor ST2-2 may include a gate electrode G2-2, the second lower line 120, a first electrode, and a second electrode. The gate electrode G2-2 may be a top gate electrode located above an active layer of the second sub-transistor ST2-2, and the second lower line 120 may be a bottom gate electrode located below the active layer of the second sub-transistor ST2-2. The gate electrode G2-2 may be a main gate electrode of the second sub-transistor ST2-2, and the second lower line 120 may be an auxiliary gate electrode of the second sub-transistor ST2-2.

A gate electrode of the third sub-transistor ST3-1 may be connected to the k-th scan initialization line GILk, a first electrode of the third sub-transistor ST3-1 may be connected to the gate electrode DTG of the driving transistor DT, and a second electrode of the third sub-transistor ST3-1 may be connected to a first electrode of the fourth sub-transistor ST3-2 and the second node N2. A gate electrode of the fourth sub-transistor ST3-2 may be connected to the k-th scan initialization line GILk, the first electrode of the fourth sub-transistor ST3-2 may be connected to the second electrode of the third sub-transistor ST3-1 and the second node N2, and a second electrode of the fourth sub-transistor ST3-2 may be connected to the initialization voltage line VIL. The second node N2 is a connection node between the third sub-transistor ST3-1 and the fourth sub-transistor ST3-2, and may connect the second electrode of the third sub-transistor ST3-1 and the first electrode of the fourth sub-transistor ST3-2 to each other.

The second lower line 120 of the second sub-transistor ST2-2 may be connected to the second node N2, which is a connection node between two sub-transistors of the third transistor ST3, which is a dual transistor. That is, the second lower line 120 may be connected to the second electrode of the third sub-transistor ST3-1 and the first electrode of the fourth sub-transistor ST3-2. The second node N2 is connected to the second lower line 120, and it is thus possible to prevent a voltage of the connection node between the sub-transistors from changing according to a change in voltage of a signal line adjacent to the connection node. For example, the second node N2 is not floated and is connected to the second lower line 120, and it is thus possible to prevent a voltage of the second node N2 from changing according to a change in voltage of the k-th scan initialization line GILk adjacent to the second node N2.

Figure 17:
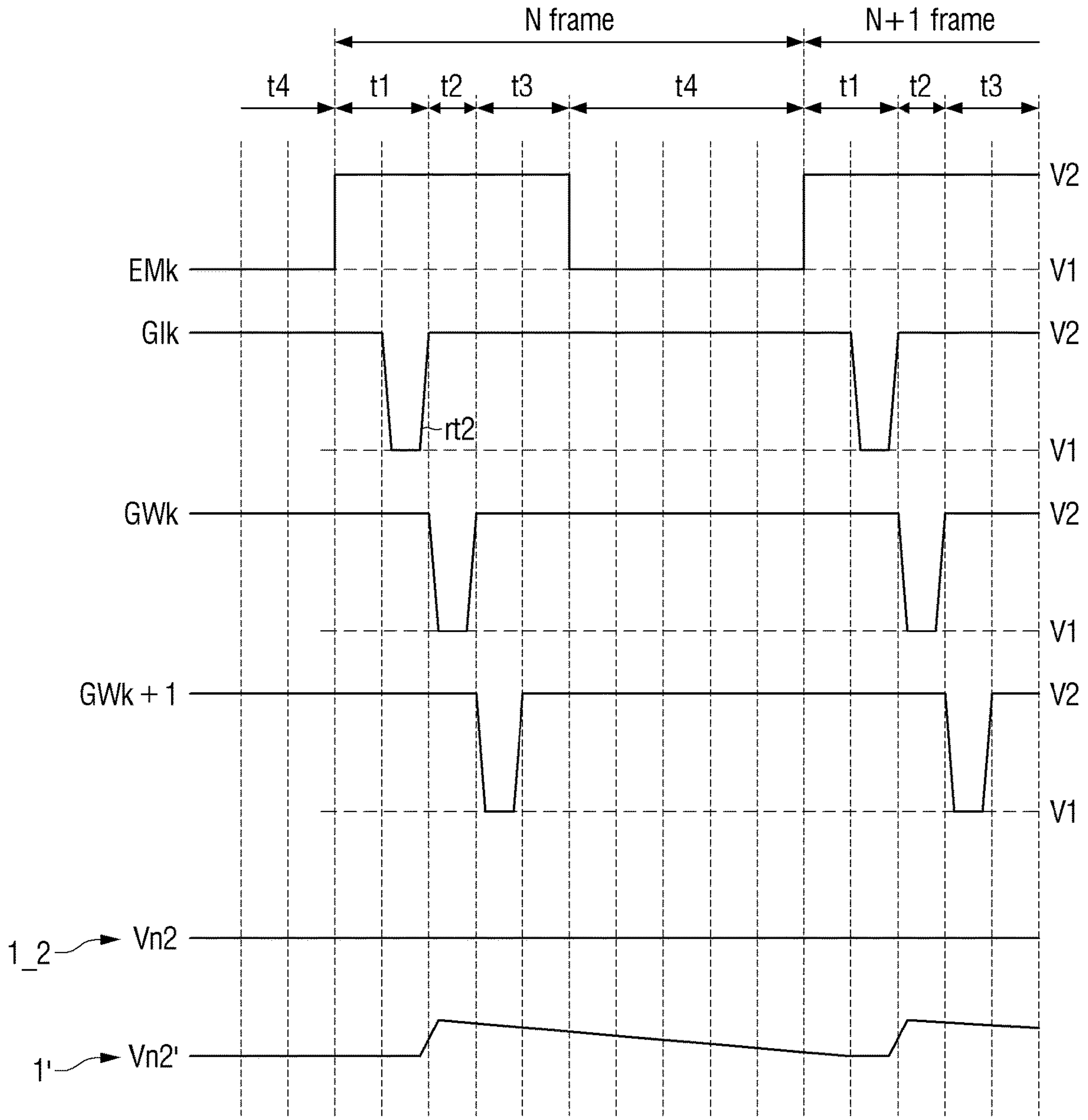
FIG. 17 is waveform diagrams illustrating a k-th emission signal, a k-th scan initialization signal, a k-th scan write signal, a k+1-th scan write signal, and a second node voltage applied to the sub-pixel according to some embodiments.
Figure 18:
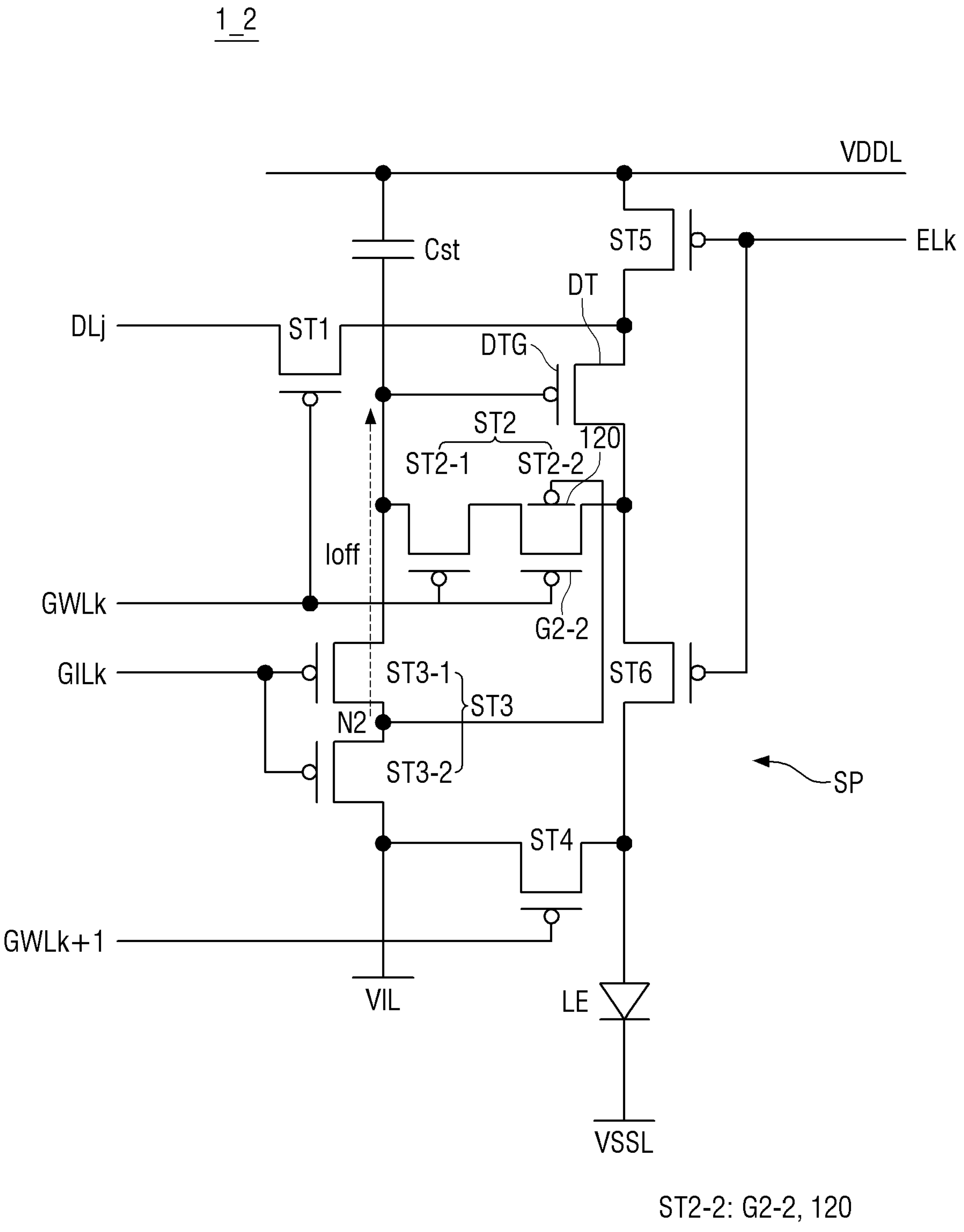
FIG. 18 is a circuit diagram for describing a driving method of the sub-pixel during a first period, a second period, a third period, and a fourth period of FIG. 17.

FIG. 17 is waveform diagrams illustrating a k-th emission signal, a k-th scan initialization signal, a k-th scan write signal, a k+1-th scan write signal, and a second node voltage applied to the sub-pixel according to some embodiments. FIG. 17 is a circuit diagram of the sub-pixel for describing an operation in a rise time of a k-th scan initialization signal.

Referring to FIG. 17, a second voltage Vn2 is a voltage of the second node N2 in the display device 1_2 in which the second lower line 120 is connected to the second node N2 according to some embodiments. A comparison voltage Vn2' is a voltage of the second node N2 in a display device 1' according to a comparative example to which the second lower line 120 is not connected to the second node N2. Referring to FIG. 17, a rise time rt2 of the k-th scan initialization signal Glk may be a period between the first period t1 and the second period t2.

A leakage current Ioff may be generated according to a change in the second voltage Vn2 of the second node N2 during the rise time rt2 of the k-th scan initialization signal Glk. The rise time rt2 of the k-th scan initialization signal Glk refers to a time during which the k-th scan initialization signal Glk rises from the first gate voltage V1 to the second gate voltage V2. For example, when the first gate voltage V1 is −7 V and the second gate voltage V2 is 7 V, a voltage of the k-th scan initialization signal Glk may increase by 14 V during the rise time rt2.

In the display device 1' according to a comparative example, when the second lower line 120 is not connected to the second node N2, the second node N2 may be an electrically floated node. Accordingly, the voltage of the second node N2 (i.e., the comparison voltage Vn2') may change according to a change in voltage of the k-th scan initialization signal Glk adjacent to the second node N2. For example, the voltage of the second node N2 may increase by about 5 V during the rise time rt2. As the voltage of the second node N2 increases, a voltage difference (Vn2'−Vg) is generated between the second node N2 and the gate electrode DTG of the driving transistor DT, and thus, the leakage current Ioff flowing from the second node N2 to the gate electrode DTG may be generated.

In the display device 1_2 according to some embodiments, when the second lower line 120 is connected to the second node N2, the voltage of the second node N2 (i.e., the second voltage Vn2) may be constant or insignificantly change in spite of the change in voltage of the k-th scan initialization line GILk. For example, the voltage of the second node N2 may be constant in spite of an increase in the voltage of the k-th scan initialization signal Glk during the rise time rt2. Accordingly, a voltage difference (Vn2−Vg) between the second node N2 and the gate electrode DTG of the driving transistor DT becomes close to 0, and thus, the leakage current Ioff flowing from the second node N2 to the gate electrode DTG may be minimized. The leakage current Ioff is minimized, such that a flickering phenomenon caused by a change in luminance of the display device 1_2 may be improved, and power consumption may be improved.

Hereinafter, in the display device 1_2 according to some embodiments, the second lower line 120 may be connected to the second node N2, and will be described in more detail with reference to FIGS. 19 and 20.

Figure 19:
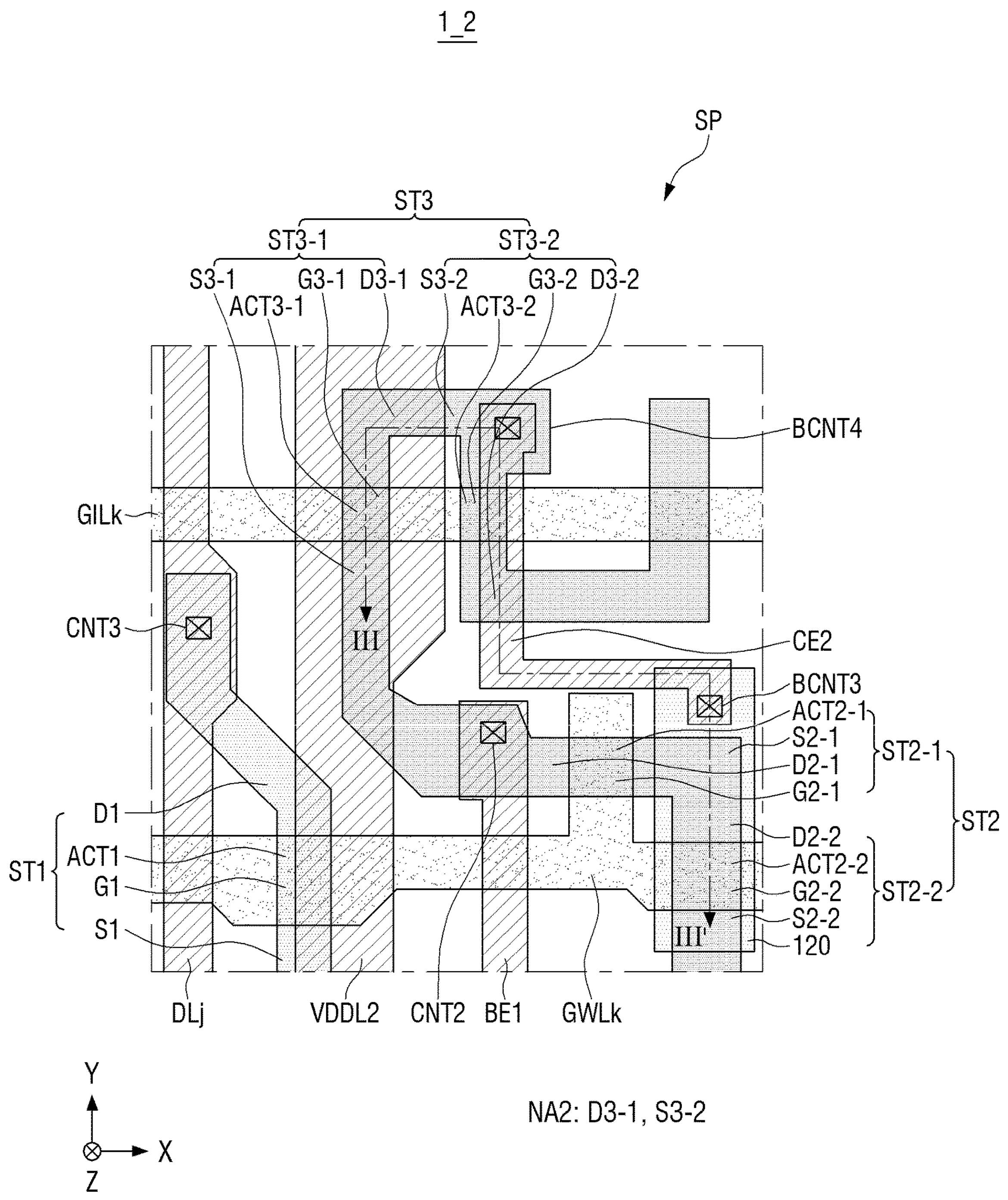
FIG. 19 is a layout diagram illustrating further details of the sub-pixel according to some embodiments.

FIG. 19 is a layout diagram illustrating further details of the sub-pixel according to some embodiments. FIG. 20 is a cross-sectional view taken along the line III-III' of FIG. 19.

Figure 20:
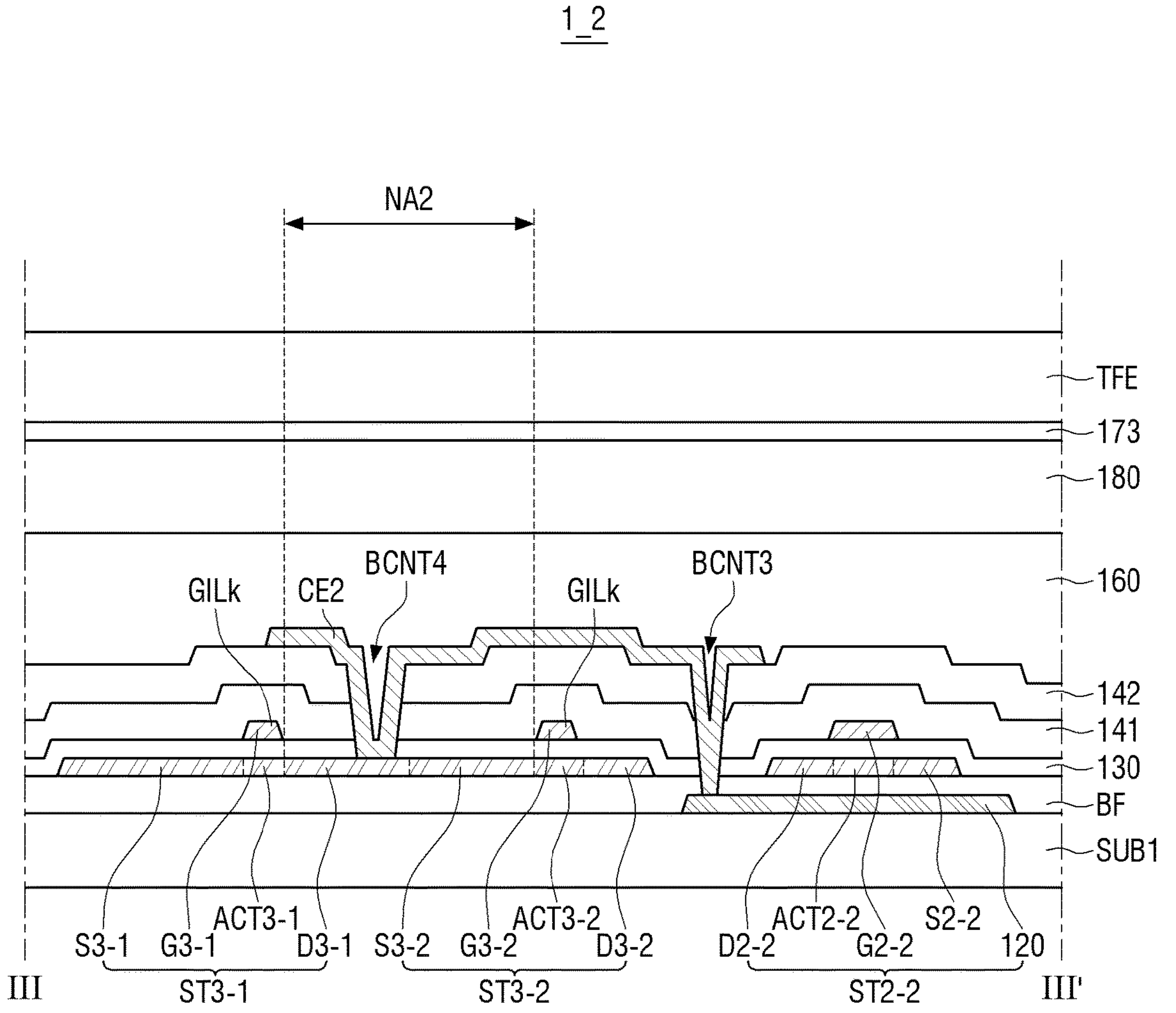
FIG. 20 is a cross-sectional view taken along the line III-III' of FIG. 19.

In FIGS. 19 and 20, the lower metal layer, the active layer, the first gate layer GTL1, the second gate layer GTL2, and the data conductive layer DTL of the sub-pixel SP are illustrated. In FIGS. 19 and 20, the first transistor ST1, the first sub-transistor ST2-1 and the second sub-transistor ST2-2 of the second transistor ST2, and the third sub-transistor ST3-1 and the fourth sub-transistor ST3-2 of the third transistor ST3, which are portions of the sub-pixel SP, are illustrated.

The lower metal layer may include the second lower line 120. The second lower line 120 may be located on the first substrate SUB1, and may be covered by the buffer film BF. The second lower line 120 may overlap the active layer ACT2-2 and the gate electrode G2-2 of the second sub-transistor ST2-2. The second lower line 120 may be a shielding line performing the same function as the first lower line 110. The second lower line 120 may be a sub-gate electrode or a bottom gate electrode of the second sub-transistor ST2-2. The second sub-transistor ST2-2 may have a double gate electrode including the top gate electrode G2-2 and the second lower line 120. The second lower line 120 may include the same material as the first lower line 110.

The second lower line 120 may be connected to a second connection electrode CE2 through a third bridge contact hole BCNT3. The second connection electrode CE2 may be connected to the second electrode D3-1 of the third sub-transistor ST3-1 and the first electrode S3-2 of the fourth sub-transistor ST3-2 through a fourth bridge contact hole BCNT4. The second lower line 120 may be connected to the second electrode D3-1 of the third sub-transistor ST3-1 and the first electrode D3-2 of the fourth sub-transistor ST3-2 through the second connection electrode CE2. In other words, the second lower line 120 may be connected to a second node area NA2 through the second connection electrode CE2.

The active layer may include the active layers ACT2-2, ACT3-1, and ACT3-2, the first electrodes S2-2, S3-1, and S3-2, and the second electrodes D2-2, D3-1, and D3-2 of the second sub-transistor ST2-2, the third sub-transistor ST3-1, and the fourth sub-transistor ST3-2. Herein, the active layer ACT2-2 of the second sub-transistor ST2-2 may be referred to as the “second channel” as described above with reference to FIGS. 13 and 14, and the active layers ACT3-1 and ACT3-2 of the third transistors ST3-1 and ST3-2 may be referred to as a “third channel”. Specifically, the active layer ACT3-1 of the third sub-transistor ST3-1 may be referred to as a third sub-channel, and the active layer ACT3-2 of the fourth sub-transistor ST3-2 may be referred to as a fourth sub-channel.

The first gate layer GTL1 may include the gate electrodes G2-2, G3-1, and G3-2 of the second sub-transistor ST2-2, the third sub-transistor ST3-1, and the fourth sub-transistor ST3-2. The gate electrode G2-2 of the second sub-transistor ST2-2 may overlap the second lower line 120 and the second sub-channel ACT2-2. The gate electrodes G3-1 and G3-2 of the third sub-transistor ST3-1 and the fourth sub-transistor ST3-2 may be portions of the k-th scan initialization line GILk. The k-th scan initialization line GILk may overlap the active layers ACT3-1 and ACT3-2 of the third transistors ST3-1 and ST3-2 referred to as the third channel at least twice. Specifically, the third sub-channel ACT3-1 of the third channel may overlap the gate electrode G3-1 of the third sub-transistor ST3-1, and the fourth sub-channel ACT3-2 of the third channel may overlap the gate electrode G3-2 of the fourth sub-transistor ST3-2.

The data metal layer DTL may include the second connection electrode CE2. The second connection electrode CE2 may be connected to the second node area NA2 through the fourth bridge contact hole BCNT4, and may be connected to the second lower line 120 through the third bridge contact hole BCNT3.

The third bridge contact hole BCNT3 may be a hole penetrating through the buffer film BF, the gate insulating film 130, the first interlayer insulating film 141, and the second interlayer insulating film 142 to expose the second lower line 120. The second connection electrode CE2 may be connected to the second lower line 120 through the third bridge contact hole BCNT3.

The fourth bridge contact hole BCNT4 may be a hole penetrating through the gate insulating film 130, the first interlayer insulating film 141, and the second interlayer insulating film 142 to expose the second electrode D3-1 of the third sub-transistor ST3-1 and the first electrode S3-2 of the fourth sub-transistor ST3-2. The fourth bridge contact hole BCNT4 may be a hole exposing the second node area NA2. The second connection electrode CE2 may be connected to the second electrode D3-1 of the third sub-transistor ST3-1 and the first electrode S3-2 of the fourth sub-transistor ST3-2 through the fourth bridge contact hole BCNT4.

In the display device 1_2 according to some embodiments, the second electrode D3-1 of the third sub-transistor ST3-1 and the first electrode S3-2 of the fourth sub-transistor ST3-2 are connected to the second lower line 120, and thus, a phenomenon in which the second node area NA2 is affected by a change in voltage of the scan line or the emission line may be minimized. For example, the second node area NA2 is connected to the second lower line 120, and it is thus possible to prevent a voltage of the second node area NA2 from changing even though the k-th scan initialization signal Glk changes. The voltage of the second node area NA2 is kept constant, and it is thus possible to prevent the voltage Vg of the gate electrode DTG from leaking due to the leakage current Ioff. The leakage current Ioff is minimized, such that a flickering phenomenon caused by a change in luminance of the display device 1_2 may be improved, and power consumption may be improved.

In concluding the detailed description, those skilled in the art will appreciate that many variations and modifications can be made to the example embodiments without substantially departing from the principles of the invention. Therefore, the disclosed example embodiments of the invention are used in a generic and descriptive sense only and not for purposes of limitation.

What is claimed is:

1. A display device comprising:

a sub-pixel connected to a k-th scan line and a j-th data line crossing the k-th scan line, wherein the sub-pixel includes:

a light emitting element;

a driving transistor configured to provide a driving current to the light emitting element according to a data voltage applied to a gate electrode thereof and including a first lower line;

a first sub-transistor and a second sub-transistor connected to each other in series;

a first node connecting the first sub-transistor and a first electrode of the second sub-transistor to each other, the first node being connected to the first lower line, the first node being between the first sub-transistor and the second sub-transistor; and the driving current is configured to pass through a second node shared by a second electrode of the second sub-transistor and a first electrode of the driving transistor, and wherein a second electrode of the driving transistor is connected to the j-th data line through a first transistor, and the first transistor is not directly connected to the gate electrode of the driving transistor, and wherein the first sub-transistor and the second sub-transistor are connected between the gate electrode of the driving transistor and a first electrode of the driving transistor in series, and directly connected to the first lower line of the driving transistor, wherein the first sub-transistor and the second sub-transistor are configured to be simultaneously turned on or simultaneously turned off.

2. The display device of claim 1, wherein the gate electrode of the driving transistor is a top gate electrode of the driving transistor, and the first lower line is a bottom gate electrode of the driving transistor.

3. The display device of claim 1, wherein each of the first sub-transistor and the second sub-transistor includes a gate electrode connected to the k-th scan line.

4. The display device of claim 3, wherein a voltage of the first node is constant at a rise time of a k-th scan signal of the k-th scan line.

5. The display device of claim 3, wherein the k-th scan line is a k-th scan write line, and is connected to a gate electrode of the first transistor.

6. The display device of claim 1, wherein the first sub-transistor includes a first electrode connected to the first electrode of the driving transistor and a second electrode connected to a first electrode of the second sub-transistor and the first node, and the second sub-transistor includes the first electrode connected to the first node and the second electrode of the first sub-transistor and a second electrode connected to the gate electrode of the driving transistor.

7. The display device of claim 1, wherein the sub-pixel further includes a first connection electrode connecting the first lower line and the first node to each other, and the first connection electrode is connected to the first lower line through a first bridge contact hole, and is connected to one electrode of the first sub-transistor and one electrode of the second sub-transistor through a second bridge contact hole.

8. The display device of claim 7, wherein the first connection electrode crosses the k-th scan line.

9. The display device of claim 1, wherein the k-th scan line includes a k-th scan write line and a k-th scan control line spaced apart from each other, the sub-pixel further includes a first transistor connected between a second electrode of the driving transistor and the j-th data line, a gate electrode of the first sub-transistor and a gate electrode of the second sub-transistor are connected to the k-th scan control line, and a gate electrode of the first transistor is connected to the k-th scan write line.

10. The display device of claim 1, wherein the first lower line overlaps the gate electrode of the driving transistor.

11. A display device comprising:

a sub-pixel connected to a k-th scan line and a j-th data line crossing the k-th scan line, wherein the sub-pixel includes:

a light emitting element;

a driving transistor configured to provide a driving current to the light emitting element according to a data voltage applied to a gate electrode thereof and including a first lower line;

a first sub-transistor and a second sub-transistor connected to the gate electrode of the driving transistor and connected to each other in series; and a first node connecting the first sub-transistor and the second sub-transistor to each other, and the first node is connected to the first lower line, wherein the sub-pixel further includes:

a second lower line overlapping a gate electrode of the second sub-transistor;

a third sub-transistor and a fourth sub-transistor connected to the gate electrode of the driving transistor and connected to each other in series; and a second node connecting the third sub-transistor and the fourth sub-transistor to each other, and wherein the second node is connected to the second lower line.

12. The display device of claim 11, wherein the third sub-transistor includes a first electrode connected to the gate electrode of the driving transistor and a second electrode connected to a first electrode of the fourth sub-transistor and the second node, and the fourth sub-transistor includes the first electrode connected to the second node and the second electrode of the third sub-transistor and a second electrode connected to an initialization voltage line.

13. The display device of claim 11, wherein the k-th scan line includes a k-th scan initialization line, each of the third sub-transistor and the fourth sub-transistor is connected to the k-th scan initialization line, and the gate electrode of the driving transistor is initialized according to a k-th scan initialization signal of the k-th scan initialization line.

14. The display device of claim 13, wherein a voltage of the second node is constant at a rise time of the k-th scan initialization signal of the k-th scan initialization line.

15. The display device of claim 11, wherein the sub-pixel further includes a second connection electrode connecting the second lower line and the second node to each other, and the second connection electrode is connected to the second lower line through a third bridge contact hole, and is connected to one electrode of the third sub-transistor and one electrode of the fourth sub-transistor through a fourth bridge contact hole.

16. A display device comprising:

a substrate;

a first metal pattern on the substrate;

a buffer film on the first metal pattern;

an active layer on the buffer film, the active layer including a first channel overlapping the first metal pattern and a second channel including a first sub-channel and a second sub-channel connected to each other through a first node area;

a gate insulating film on the active layer;

a first gate conductive layer on the gate insulating film, the first gate conductive layer including a gate electrode overlapping the first channel and the first metal pattern, and a k-th scan line overlapping both the first sub-channel and the second sub-channel;

a first interlayer insulating film on the first gate conductive layer;

a second gate conductive layer on the first interlayer insulating film;

a second interlayer insulating film on the second gate conductive layer; and a first connection electrode on the second interlayer insulating film, wherein the first connection electrode is connected to the first metal pattern through a first bridge contact hole, and is connected to the first node area between the first sub-channel and the second sub-channel through a second bridge contact hole.

17. The display device of claim 16, wherein the first bridge contact hole penetrates through the buffer film, the gate insulating film, the first interlayer insulating film, and the second interlayer insulating film to expose the first metal pattern, and the second bridge contact hole penetrates through the gate insulating film, the first interlayer insulating film, and the second interlayer insulating film to expose the first node area.

18. The display device of claim 16, wherein the k-th scan line extends in one direction to overlap the second sub-channel, and at least partially protrudes in an other direction crossing the one direction to overlap the first sub-channel, and the first connection electrode extends in still another direction to overlap the k-th scan line.

19. The display device of claim 16, further comprising:

a second metal pattern on the substrate, the second metal pattern being covered by the buffer film;

a third channel including a third sub-channel and a fourth sub-channel on the buffer film, the third sub-channel and the fourth sub-channel being covered by the gate insulating film, and connected to each other through a second node area;

a sub-gate electrode on the gate insulating film, the sub-gate electrode overlapping the second sub-channel and the second metal pattern;

a k-th scan initialization line on the gate insulating film, the k-th scan initialization line overlapping the third channel at least twice; and a second connection electrode on the second interlayer insulating film, wherein the second connection electrode is connected to the second metal pattern through a third bridge contact hole, and is connected to the second node area between the third sub-channel and the fourth sub-channel through a fourth bridge contact hole.

20. The display device of claim 19, wherein the third bridge contact hole penetrates through the buffer film, the gate insulating film, the first interlayer insulating film, and the second interlayer insulating film to expose the second metal pattern, and the fourth bridge contact hole penetrates through the gate insulating film, the first interlayer insulating film, and the second interlayer insulating film to expose the second node area.

* * * * *